United States Patent
Cox, Jr.

(10) Patent No.: US 9,580,340 B1
(45) Date of Patent: *Feb. 28, 2017

(54) METHODS FOR MANAGING SULFIDE IN WASTEWATER SYSTEMS

(71) Applicant: Biosystems Consulting, Inc., Blacksburg, VA (US)

(72) Inventor: Henry Wilmore Cox, Jr., Blacksburg, VA (US)

(73) Assignee: Biosystems Consulting, Inc., Blacksburg, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/196,173

(22) Filed: Jun. 29, 2016

Related U.S. Application Data

(63) Continuation of application No. 14/723,643, filed on May 28, 2015, now Pat. No. 9,399,590, which is a continuation of application No. 14/561,537, filed on Dec. 5, 2014, now Pat. No. 9,067,812, which is a continuation of application No. 14/065,932, filed on Oct. 29, 2013, now Pat. No. 8,937,210, which is a continuation of application No. 12/762,415, filed on Apr. 19, 2010, now Pat. No. 8,609,926, which is a continuation of application No. 11/943,705, filed on Nov. 21, 2007, now Pat. No. 7,846,408.

(60) Provisional application No. 61/172,283, filed on Apr. 29, 2009, provisional application No. 60/860,295, filed on Nov. 21, 2006.

(51) Int. Cl.
| | | |
|---|---|---|
| *A62D 3/38* | (2007.01) | |
| *C02F 1/72* | (2006.01) | |
| *C02F 1/68* | (2006.01) | |
| *C02F 1/74* | (2006.01) | |
| *C02F 3/30* | (2006.01) | |
| *C02F 101/10* | (2006.01) | |

(52) U.S. Cl.
CPC ............... *C02F 1/72* (2013.01); *C02F 1/683* (2013.01); *C02F 1/725* (2013.01); *C02F 1/727* (2013.01); *C02F 1/74* (2013.01); *C02F 3/301* (2013.01); *C02F 2101/101* (2013.01); *C02F 2209/06* (2013.01); *C02F 2209/15* (2013.01); *C02F 2209/26* (2013.01); *C02F 2305/02* (2013.01); *C02F 2305/026* (2013.01); *C02F 2307/08* (2013.01)

(58) Field of Classification Search
CPC ...................................................... A62D 3/38
USPC .... 588/320, 315, 313, 318, 405; 423/244.01
See application file for complete search history.

(56) References Cited

U.S. PATENT DOCUMENTS

| | | | |
|---|---|---|---|
| 5,707,523 A | 1/1998 | Temple | |
| 6,466,317 B1 | 10/2002 | Temple | |
| 6,491,827 B1 | 12/2002 | Temple | |
| 6,511,611 B2 | 1/2003 | Temple | |
| 6,645,450 B2 | 11/2003 | Stoltz | |
| 7,112,309 B2 | 9/2006 | Stoltz | |
| 7,550,123 B2 | 6/2009 | Temple | |
| 7,815,879 B2 | 10/2010 | Temple | |
| 7,846,408 B1 * | 12/2010 | Cox, Jr. | C02F 1/725 423/244.01 |
| 8,409,512 B2 | 4/2013 | Temple | |
| 8,480,924 B1 | 7/2013 | Cox | |
| 8,609,926 B1 * | 12/2013 | Cox, Jr. | C02F 1/725 423/244.01 |
| 8,753,566 B1 | 6/2014 | Temple | |
| 8,858,806 B1 | 10/2014 | Cox | |
| 8,937,210 B1 * | 1/2015 | Cox, Jr. | C02F 1/725 588/320 |
| 9,067,812 B1 * | 6/2015 | Cox, Jr. | C02F 1/725 |
| 2001/0043898 A1 | 11/2001 | Stoltz | |
| 2002/0130089 A1 | 9/2002 | Temple | |
| 2004/0115112 A1 | 6/2004 | Stoltz | |
| 2010/0024644 A1 | 2/2010 | Temple | |
| 2011/0104012 A1 | 5/2011 | Temple | |
| 2012/0087827 A1 | 4/2012 | Temple | |
| 2014/0003995 A1 | 1/2014 | Temple | |
| 2014/0202206 A1 | 7/2014 | Temple | |

* cited by examiner

*Primary Examiner* — Edward Johnson
(74) *Attorney, Agent, or Firm* — Michael Haynes PLC; Michael N. Haynes

(57) ABSTRACT

Certain exemplary embodiments can provide a system, machine, device, manufacture, circuit, composition, and/or user interface adapted for and/or resulting from, and/or a method and/or machine-readable medium comprising machine-implementable instructions for, activities that can comprise and/or relate to, in a treatment zone, reacting an oxygen-comprising gas, one or more selected ferric/ferrous chelates, one or more selected nitrates and/or nitrites, and/or anaerobic wastewater.

25 Claims, 12 Drawing Sheets

1000

```
┌─────────────────────────┐
│   Determine treatment   │  1010
│      parameters         │
└───────────┬─────────────┘
            ↓
┌─────────────────────────┐
│  Prepare ferric chelate,│
│     oxidizing agent,    │  1020
│   nitrate/nitrite, and/or│
│   oxygen-containing gas │
└───────────┬─────────────┘
            ↓
┌─────────────────────────┐
│   Apply ferric chelate, │
│     oxidizing agent,    │
│  nitrate/nitrite, and/or│  1030
│  oxygen-containing gas  │
│   to contaminant and/or │
│         medium          │
└───────────┬─────────────┘
            ↓
┌─────────────────────────┐
│  Monitor, adjust, and/or│  1040
│     control reaction    │
└───────────┬─────────────┘
            ↓
┌─────────────────────────┐
│ Dispose of decontaminated│ 1050
│         medium          │
└─────────────────────────┘
```

FIG. 1

Summary of Pilot Studies for the Catalyzed Treatment of Sulfide in Wastewater Collection Systems

| Chemistry Used | Force Main Parameters | | | | Average Waterborne Sulfide (mg/l) | | Average Airborne Sulfide (ppml) | | Catalyst Dose Rate Gallons/Day | Oxygen/Air Dose Rate (lbs/Day) |
|---|---|---|---|---|---|---|---|---|---|---|
| Location | Diameter (inches) | Length (feet) | Flow (MGD) | Average Retention (hours) | Untreated | Treated | Untreated | Treated | | |
| VTX/Oxygen | | | | | | | | | | |
| Clarksville, IN | 24 | 7920 | 1.4 | 5.5 | 13 | < 0.5 | 550 | <5 | 4.5 | 400 |
| Clarksville, TN | Clarksville, TN: Tylertown and Bluegrass merge prior to exiting to Terminus | | | | | | | | | |
| Tylertown | 12 | 5700 | 0.19 | 4.25 | NA | NA | NA | NA | 1.06 | 20 |
| Bluegrass | 8 | 5500 | 0.097 | 4 | NA | NA | NA | NA | 0.54 | 10 |
| Manifold to Terminus | 12 | 2300 | 0.287 | 1.13 | 2.75 | < 0.5 | 226 | 2 | NA | NA |
| Midwest Agricultural Processor Pond A | NA | NA | 94 | >24 | 5 | 0 | 0.23 | 0 | 75 | Unknown amount Aeration only |
| Midwest Agricultural Processor Pond B | NA | NA | 91 | >24 | 2 | 0 | 0.24 | 0 | 13.2 | Unknown amount Aeration only |
| Grand Island, NE | 16 | 3125 | 3.4 | 0.283 | 250 | 2.5 | NA | NA | 192 | 11520 |
| Endurox 41/Oxygen | | | | | | | | | | |
| Durham, NC | 12 | 22,500 | 0.216 | 16.3 | NA | NA | 62 | 13 | 7.5 | 30 |
| Endurox 11/Oxygen | | | | | | | | | | |
| Durham, NC | 12 | 22,500 | 0.216 | 16.3 | NA | NA | 62 | 15 | 7.5 | 30 |

FIG. 12

METHODS FOR MANAGING SULFIDE IN WASTEWATER SYSTEMS

CROSS-REFERENCES TO RELATED APPLICATIONS

This document claims priority to and incorporates-by-reference in its entirety the following:
U.S. Provisional Patent Application 61/172,283, filed 24 Apr. 2009;
pending U.S. patent application Ser. No. 11/943,705, filed 21 Nov. 2007; and
U.S. Provisional Patent Application Ser. No. 60/860,295, filed 21 Nov. 2006.

BRIEF DESCRIPTION OF THE DRAWINGS

A wide variety of potential practical and useful embodiments will be more readily understood through the following detailed description of certain exemplary embodiments, with reference to the accompanying exemplary drawings in which:
FIG. 1 is a flowchart of an exemplary embodiment of a method 1000;
FIG. 12 is a table summarizing data obtained from certain pilot studies.

DETAILED DESCRIPTION

Figure 2:
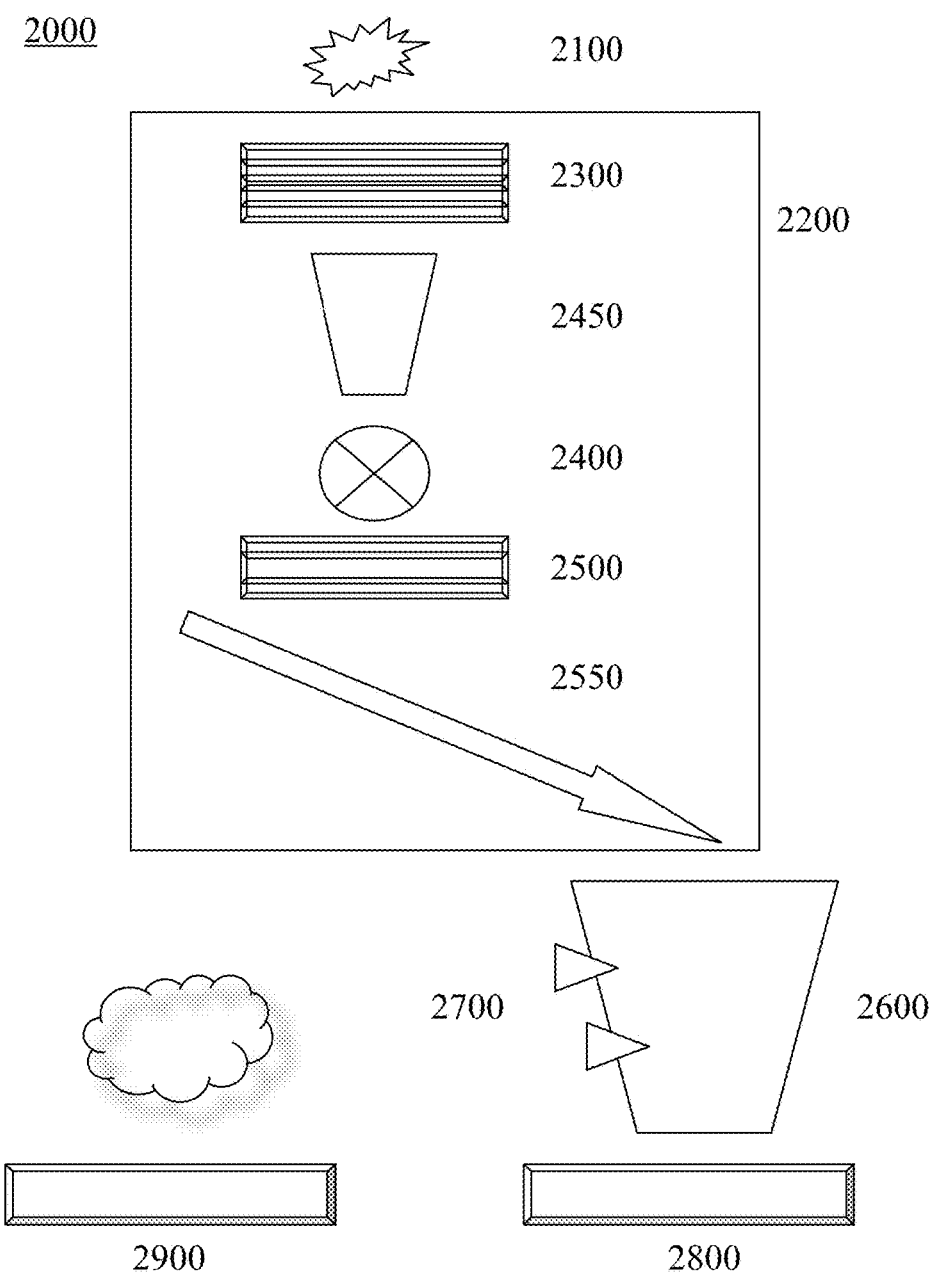
FIG. 2 is a block diagram of an exemplary embodiment of a system 2000.

Sulfides in sewerage and industrial wastewater collection systems can be treated using certain oxidation technologies, yet these treatment approaches can be costly and/or ineffective.

Certain exemplary embodiments can comprise compositions, methods, and/or systems which can be useful for the management and/or treatment of existing total sulfide within anaerobic industrial and/or municipal wastewater. Certain exemplary methods can utilize compressed pure oxygen and/or atmospheric oxygen within anaerobic industrial and/or municipal wastewater collection system piping and/or vessels to react with selected ferric/ferrous chelates (such as the ferro aminocarboxylates), potentially including ferric/ferrous MGDA, ferric/ferrous EDTA, ferric/ferrous HEIDA ferric/ferrous NTA, ferric/ferrous gluconate and/or other ferric chelants. The reaction of the ferric/ferrous chelates within the anaerobic collection systems can oxidize chelates in the ferrous state to the ferric state. It is currently projected that the ferric chelate can react with sulfide to rapidly oxidize sulfide which can create elemental sulfur at a circumneutral pH. In the process, ferric chelate can be reduced to the ferrous chelate state. Additional oxygen from the pure oxygen and/or compressed air injections then can oxidize the resulting ferrous chelate back to the ferric chelate state for an additional reaction with sulfide. This cycle can continue until oxygen is fully depleted. A blend of nitrate and ferro chelate can be an additional exemplary embodiment. The blend of these two chemical agents can serve to extend the life of the treatment for sulfide and/or prevent further generation of sulfide after oxygen is fully consumed.

Certain exemplary embodiments can require that the pH be in a circumneutral range of approximately 6.0 to approximately 8.5. Certain exemplary embodiments can require that pure oxygen and/or compressed air be diffused through an inline gas diffusing/sparging system upstream to allow for at least 3 minutes of contact time to the point at which the wastewater exits the pipe to the atmosphere. Ferric/ferrous chelate can be injected so as to completely mix with the oxygen and/or compressed air. Effective rapid treatment of sulfide can require contact between oxygen and the ferro chelate for at least 3 minutes before wastewater exits the anaerobic environment. Therefore, contact time between oxygen and/or air and the target wastewater can be at least 3 minutes. Data suggests that control of sulfide using such methods can continue for hours. In one exemplary embodiment, data suggests that control of sulfide can be expected for up to 24 hours.

Ferro chelates can be added at a rate of approximately 27 grams to approximately 134.4 grams of ferro chelate (as iron) per part per million of sulfide per million gallons of wastewater. Higher dosages can be used to achieve a more rapid response. Nitrate can be added in a blend with the ferro chelates to extend the life of the process at a rate of application that equates to approximately 3.8 kg to approximately 11.4 kg of nitrate (as NO3) per part per million sulfide per million gallons of wastewater.

Certain exemplary embodiments can comprise compositions, methods, and/or systems that can be useful for the treatment of existing total sulfide within anaerobic wastewater and/or to prohibit further formation of sulfide after removal. Certain exemplary processes can utilize selected ferric chelates (such as the ferro aminocarboxylates), potentially including ferric/ferrous MGDA, ferric/ferrous EDTA, ferric/ferrous HEIDA, ferric/ferrous NTA, ferric/ferrous gluconate, and/or other ferric chelants, in combination with an oxidant, such as hydrogen peroxide, calcium peroxide, magnesium peroxide, ozone, persulfate, chlorite, hypochlorite, chlorine, bromine, permanganate, and/or chlorine dioxide, to produce highly reactive free and/or hydroxyl radicals to oxidize existing total sulfide to elemental sulfur. A second tier of treatment can be achieved through the addition of nitrate and/or nitrite from calcium, sodium, potassium, ad/or ammonium nitrate/nitrite salts. It is suggested that nitrate/nitrite might react with the ferric/ferrous chelates to shift a selected ferrous chelate to ferric chelate that then reacts with sulfide to oxidize it to elemental sulfur. The remaining nitrate can act to stop further formation of sulfide under anaerobic conditions for lengthy periods of time, depending on nitrate dosage. The combination of various process steps can results in a system that can effectively treat existing total sulfide and/or prevent the formation of additional sulfide under extended anaerobic conditions that are conducive to biological sulfide formation.

It is not necessarily currently known with certainty exactly how certain embodiments might cause the reduction in concentration of the total sulfide contaminant. Nevertheless, the potential theory to describe the mechanism of the reaction is described by the inventor above.

Hydroxyl radicals can be generated during processes involving the catalyzed activation of hydrogen peroxide using such metals as iron, copper, manganese, and/or other transition metal compounds. One group of such processes is Fenton-type chemical reaction systems, which can employ ferrous salts and/or hydrogen peroxide in acidified (pH approximately 2 to approximately 3) soil and/or water suspensions.

In the classic Fenton reaction (Equation 1, below), ferrous ion rapidly reduces hydrogen peroxide to primarily hydroxyl radicals, which can react with and degrade a target contaminant. The classic Fenton reaction involves hydrogen peroxide and a ferrous iron catalyst. The peroxide is broken down into a hydroxide ion and a hydroxyl free radical. The hydroxyl free radical is the primary oxidizing species and can be used to oxidize and break apart organic molecules.

(Equation 1)

A further description of Fenton-type reactions is provided in "Fenton's Reagent-Iron-Catalyzed Hydrogen Peroxide", which is published by US Peroxide, Laguna Niguel, Calif., at the web site h2o2.com/applications/industrialwastewater/fentonsreagent.html, which is incorporated by reference herein in its entirety.

In the classic Fenton reaction, ferrous ion is required in stoichiometric amounts. Peroxide demand, and therefore, ferrous ion demand can be high in certain media, such as soil for example, due to competitive oxidation of soil organic matter and/or soil-catalyzed decomposition. Ferrous ion can be oxidized by the hydroxyl radicals, and therefore can compete with the target compounds unless its concentration is kept low by gradual addition in dilute form.

As used herein, the term "ferric chelate" means any one of a number of organic and inorganic polydentate ligands complexed with ferric ion, Fe(III). An "active" ferric chelate is one that exhibits activity toward oxidation of the contaminant to be degraded, i.e., is capable of generating free radicals and/or other reactive oxidants from an oxidant (also referred to as an "oxidizing agent" herein), such as a peroxide or a persulfate in the presence of a medium associated with the contaminant.

As an example, the medium can be any anaerobic liquid, such as water, groundwater, leachate, wastewater, sewer water, blackwater, graywater, bilge water, ballast water, feed water, process water, industrial water, irrigation water, recreational water, pond water, lake water, creek water, river water, rain water, runoff water, pool water, cooling water, non-potable water, potable water, drinking water, semi-pure water, and/or spent ultra-pure water, etc.

Numerous embodiments are possible. The following exemplary embodiments are intended to merely illustrate, and not limit, the breadth and depth of embodiments that can fall within the scope of any current and/or future claims.

Method 1000

FIG. 1 is a flowchart of exemplary embodiment of a method 100, which can begin at activity 1010 by determining the treatment parameters. Included in this determination can be activities such as sampling the medium to detect if sulfide contaminant is present, analyzing the sample or the medium to determine the concentration of the sulfide contaminant, determining an amount of the medium to treat, determining where to treat the medium (e.g., distance upstream within flow), and/or determining temperatures, pressures, and/or flowrates of the medium, the ferric/ferrous chelate, and/or the amount of oxygen required.

At activity 1020, effective amounts of the ferric/ferrous chelate can be prepared. One method of preparing ferric/ferrous chelate is to directly mix with a chelated agent a source of ferric ion, such as an aqueous solution of a ferric salt, such as ferric perchlorate, ferric nitrate, ferric citrate, ferric malate, ferric lactate, and/or ferric oxalate, etc. Numerous chelating agents are available that can work with substantially equal effectiveness, such as sodium gluconate (GLC), sodium nitriloacetate NTA), sodium methylglucine diacetate (MGDA), and/or sodium ethyldiaminetricacetate (EDTA). Another method is to mix a liquid ferric chloride solution with sodium gluconate. Ferric chloride can be purchased as a approximately 13% ferric solution with a pH of about 1.0 to about 1.5 from Univar, 825 Fisher Street, Martinsville, Va., in 55 gallon drum and tanker load quantities.

The chelating agent, which is sometimes referred to as gluconate and/or as sodium gluconate, can be purchased from Jungbunzlauer AG, St. Alben-Vorstadt 90, CH-4002, Basel, Switzerland. It can be purchased as a powdered concentrate in 25 kg bags and 1000 kg bags. Sodium gluconate is the sodium salt of gluconic acid, which can be produced by fermentation of glucose. It can be white to tan in color, granular to fine in particle size, very soluble in water, non-corrosive, non-toxic, and/or readily biodegradable (98% after 2 days).

Formulation of one liter of the ferric chelate, ferric/ferrous gluconate (Fe-GLC) can be made by adding approximately 52.3 milliliters (approximately 27 grams of GLC-Na3 depending on density) of sodium gluconate to approximately 800 milliliters of water. This solution can be then mixed continuously with a magnetic stir bar and/or other mechanical mixing technique. Liquid ferric chloride solution can be added to the solution while the pH of the mixture is monitored. The pH of gluconate/water mixture can be adjusted from approximately 10 to approximately 12 initially with sodium hydroxide. Ferric chloride then can be added until the pH of the solution comes down to a pH of approximately 7.2. Water can be added to achieve a final volume of approximately 1000 millimeters. At this point the Fe-GLC can be ready for use. Different volumes can be produced by scaling-up or scaling-down this formulation as desired. In certain exemplary embodiments, liquid ferric chloride solution can be added to GLC as a concentrated water/liquid mixture at approximately 40% sodium gluconate to approximately 60% water with a final pH of the ferric gluconate solution being approximately 7.2 after the ferric chloride titration. Higher or lower molar solutions can also be prepared.

The chelating agent MGDA, which is sometimes referred to as methylglycinediacetate and/or as trisodium methylglycinediacetate, can be purchased from BASF Corp, 3000 Continental Drive—North, Mount Olive, N.J. 07828-1234, under their product name, Trilon M. It can be purchased as an approximately 39% concentrated liquid in 55 gallon drum and tanker load quantities. Trilon M has a density of approximately 1.29 to approximately 1.33 g/cm3, a pH of approximately 10.0 to approximately 12.0, and a molecular weight of MGDA-Na3: 271.

Formulation of one liter of the ferric chelate Fe-MGDA (sometimes referred to herein as VTX) can be made by adding approximately 52.3 milliliters (approximately 27 grams of MGDA-Na3 depending on density) of Trilon M liquid to approximately 800 milliliters of water. This solution can be then mixed continuously with a magnetic stir bar and/or other mechanical mixing technique. Liquid ferric chloride solution can be added to the solution while the pH of the mixture is monitored. The pH of Trilon M/water mixture can be from approximately 10 to approximately 12 initially. Ferric chloride can be added until the pH of the solution comes down to a pH of approximately 5.0. Water can be added to achieve a final volume of approximately 1000 millimeters. At this point the Fe-MGDA can be ready for use. Different volumes can be produced by scaling-up or scaling-down this formulation as desired. In various alternative embodiments, liquid ferric chloride solution can be added to undiluted MGDA. Higher and/or lower molar solutions can also be prepared.

Formulation of a nitrate solution, which can enhance the long term treatment effect of this procedure, can be made by adding sodium nitrate, calcium nitrate, nitric acid, and/or any other salt of nitrate to a ferro chelate solution to attain a final concentration of nitrate in a range of approximately 3.5 M to approximately 4.5 M with a final ferro chelate concentration in a range of approximately 0.05 M to approximately 1.0 M. A typical formulation might be a 4.2 M nitrate and 0.1 M ferro chelate mixture.

Oxygen addition, as either a pure commercially available oxygen, a pure oxygen that might be made at the site of treatment, and/or as introduced through compressed atmospheric oxygen, can be introduced. For the sulfide in an anaerobic wastewater stream to be oxidized substantially completely, the oxygen can be provided at a concentration of at least a theoretical stoichiometric ratio, that is, at a concentration of at least 1.0 times the available sulfide to be treated. For higher assurance of substantially complete oxidation, the oxygen can be introduced at a concentration of at least approximately 1.5 times the amount of available sulfide to be treated within the anaerobic wastewater stream. Higher dosages of oxygen can further speed the reaction efficiency. For example, the oxygen to sulfide concentrations can range from approximately 1.5 to approximately 6 or higher on a mass-to-mass basis (including all values and sub-ranges therebetween).

The Fe-GLC, Fe-MGDA, and/or numerous other ferro chelates can be applied to a contaminated medium before, during, in combination with, and/or after oxygen and/or air in amounts and/or concentrations effective to degrade, and/or substantially reduce, the concentration of, the target sulfide contaminant. The amounts of Fe-GLC, Fe-MGDA, and/or other ferro chelates and oxygen and/or air needed and/or utilized can depend upon, for example, the concentration of the sulfide contaminant to be degraded, the available reaction time, temperature of the reactants (e.g., the Fe-GLC, Fe-MGDA, and/or other ferro chelates, the oxygen/air, and/or the contaminated medium), and/or the organic matter content of the medium.

In certain exemplary embodiments, the Fe-GLC, Fe-MGDA, and/or other ferro chelates and oxygen and/or air can be mixed, and even conveyed, before being applied to the contaminated medium. In certain exemplary embodiments, the Fe-GLC, Fe-MGDA, and/or other ferro chelates and the oxidizing agent can mix while in contact with the contaminated medium.

At activity 1030, the Fe-GLC, Fe-MGDA, and/or other ferro chelates and oxygen can be applied to the contaminant, the medium, and/or the contaminated medium. Either of the Fe-GLC, Fe-MGDA, and/or other ferro chelates and the oxidizing agent can be applied as liquid or vapor.

At activity 1040, the reaction between the Fe-GLC, Fe-MGDA, and/or other ferro chelates, oxygen and/or air, and the contaminant can be monitored, adjusted, and/or controlled. For example, included in this activity can be activities such as sampling the medium to detect if a contaminant is still present, analyzing the sample or the medium to identify what contaminant remains and/or to determine what concentrations of the contaminant remain, and/or monitoring, adjusting, and/or controlling temperatures, pressures, and/or flowrates of the contaminated medium, the Fe-GLC, Fe-MGDA, and/or other ferro chelates, the oxygen and/or air, and/or the decontaminated medium.

At activity 1050, the decontaminated medium can be disposed. Prior to disposal, however, the medium can be sampled to detect if any sulfide contaminant is still present. Further, a determination can be made regarding how much reduction has occurred in the target sulfide contaminant.

The decontaminated medium can be conveyed to a disposal site, and/or can be discharged at the disposal site. The disposal site can be, for example, a waterway, an injection well, and/or a landfill.

System 2000

FIG. 2 illustrates a system 2000 for treating a sulfide contaminated medium.

Aliquots of contaminated wastewater can be exposed to varying levels of oxygen and/or air and Fe-GLC, Fe-MGDA, and/or other ferro chelates. Once treated, the wastewater can be tested for the target contaminants to determine the efficacy of individual dose rates. Generally speaking, an effective dose rate can be approximately 2 cubic centimeters of oxygen for moderately contaminated wastewater (i.e. approximately 10 mg/l of sulfide contaminant in wastewater) and/or approximately 0.05 milliliters of approximately 0.3 to approximately 1.0 M Fe-GLC, Fe-MGDA, and/or other ferro chelates per liter. Deviations from this range can be employed.

Once the appropriate dosage of oxygen and/or air and Fe-GLC, Fe-MGDA, and/or other ferro chelates are determined, the sulfide contaminated wastewater can be demonstrated on a pilot scale by diffusing oxygen in-line from approximately 3 minutes to approximately 30 minutes upstream of the exit point of the wastewater to atmosphere. Fe-GLC, Fe-MGDA, and/or other ferro chelates can be metered into the line above the oxygen diffusion point via a typical metering pump. Metering of Fe-GLC, Fe-MGDA, and/or other ferro chelates came be accomplished just prior to or just after oxygen and/or air diffusion, or upstream at the nearest available access point within approximately 8 hours of contact between the Fe-GLC, Fe-MGDA, and/or other ferro chelates dosage point and the oxygen and/or air addition point.

Figure 9:
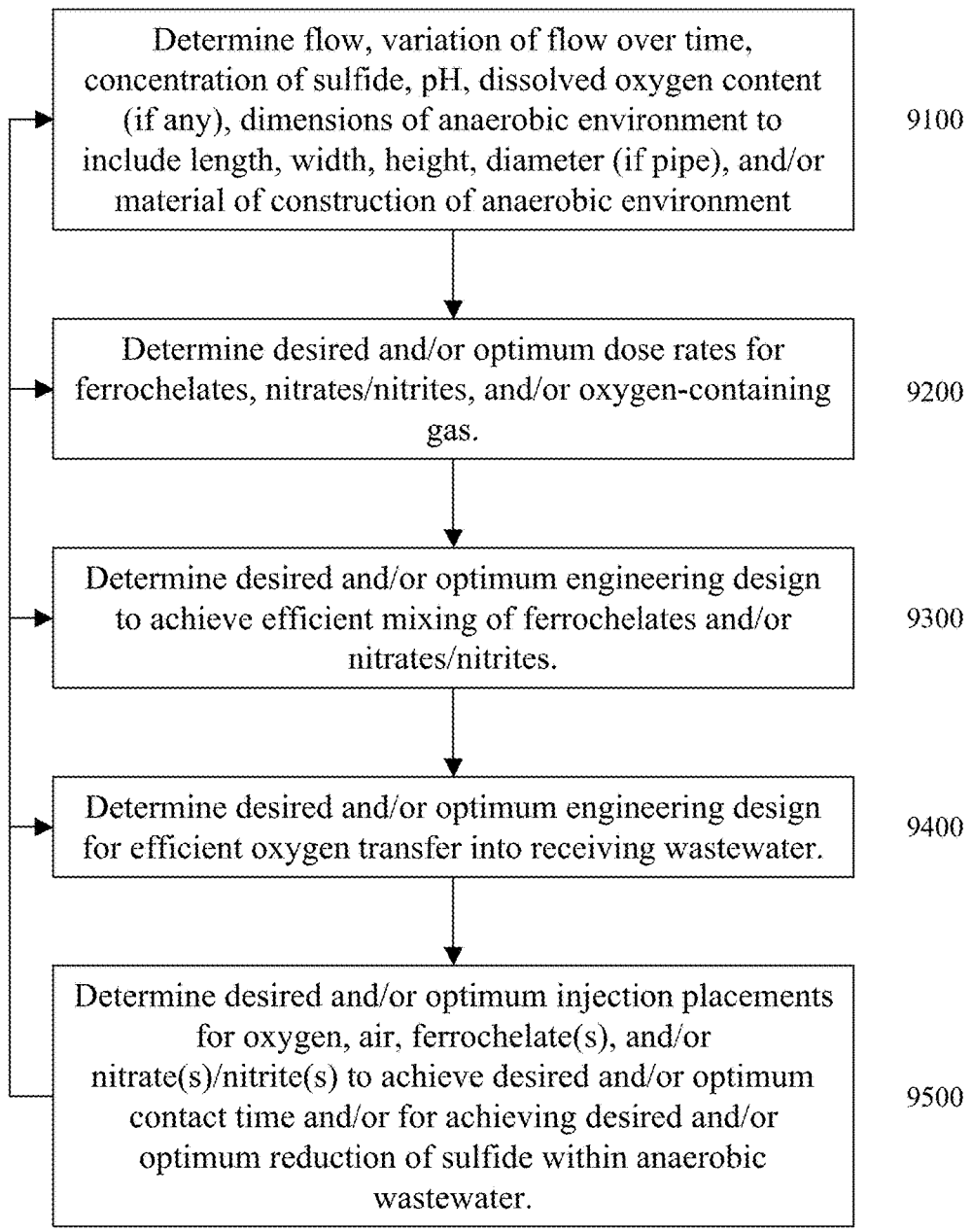
FIG. 9 is a flowchart of an exemplary embodiment of a method 9000.
Figure 10:
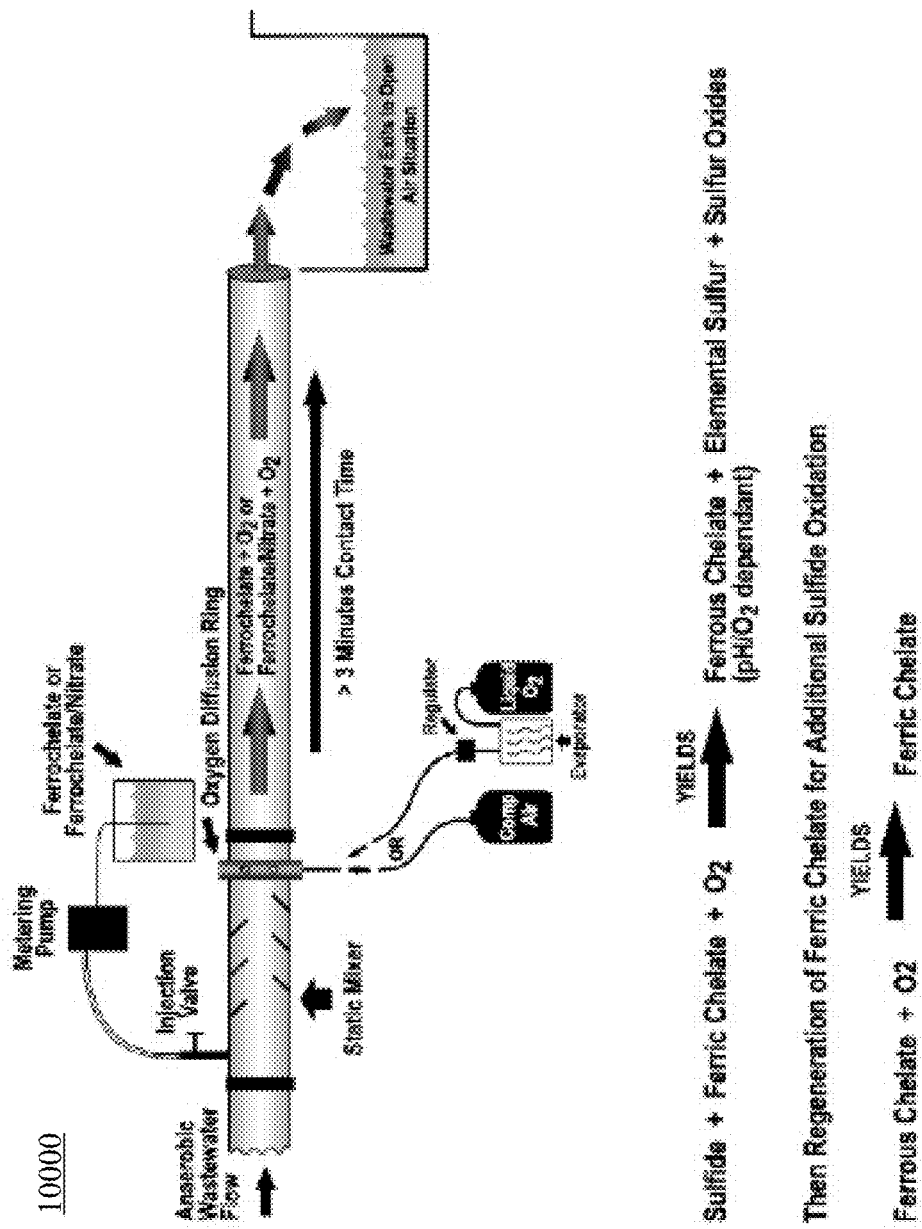
FIG. 10 is a block diagram of an exemplary embodiment of a system 10000.

Additional potential methods, systems, and/or equipment configurations are shown in FIGS. 9 and 10.

Physical-Chemical Properties of Hydrogen Sulfide

Hydrogen sulfide ($H_2S$) can occur in many ground waters. Its presence in such waters is not necessarily due to breakdown of organic matter. Its presence can be due to the bacterial reduction of sulfate. That is, certain bacteria can be able to split oxygen from the sulfate ion, $SO_4^=$, a common constituent of natural waters, and use it to oxidize organic matter. The sulfur then can be left in the form of the sulfide ion, $S^=$, which immediately can change by reaction with water to a mixture of $H_2S$ and $HS^-$ (read H S ion).

$H_2S$ can present as a gas slightly heavier than air. At atmospheric pressure, it condenses to a liquid only at the low temperature of approximately −62° C. It is fairly soluble in water. For example, at approximately 20 C, it can dissolve in pure water to the extent of approximately 3850 milligrams per liter (mg/l), or approximately 2.7 liters of $H_2S$ gas per liter of water. The solubility decreases approximately 2.5% for each degree C. increase of temperature. The stated solubility is the amount that will dissolve when the pure gas is brought into contact with pure water. From $H_2S$ diluted with air, it will dissolve only in proportion to its concentration in the gas mixture. Thus, for example, at atmospheric pressure, air in which the concentration of $H_2S$ is approximately 0.1% (1000 parts per million, i.e., ppm) by volume of $H_2S$ will, if brought to equilibrium with pure water at approximately 20 C, produce a solution containing approximately 3.85 mg/l. Stated differently, water containing approximately 3.85 mg/l of $H_2S$ can produce a concentration of approximately 0.1%, or approximately 1000 ppm, in air brought into contact with it. Approximately one mg/l in solution can produce a concentration of approximately 260 ppm by volume in the air if the temperature is approximately 20 C, or approximately 330 ppm by volume if the temperature is approximately 30 C.

When dissolved in water, hydrogen sulfide can be partially ionized, so that it can exist as a mixture of $H_2S$ and $HS^-$. The proportions can depend principally upon the pH of the solution. In typical natural water at a temperature of approximately 20 C, and at approximately pH 7.0, the hydrogen sulfide can b approximately 50% ionized; that is, approximately half of it can be present as $HS^-$ and approximately half as un-ionized $H_2S$. Table 1 shows the approximate proportions ionized at other pH levels. Temperature and mineral content of the water can affect the degree of ionization. The sulfide ion, $S^=$, also can exist in water, but typically not in appreciable amounts except in solutions in which the pH is above approximately 12. The solubility data given in the previous paragraph generally applies only to the equilibrium between the gas and the slightly acidic (low-pH) solution produced when it dissolves in pure water or between the gas and the unionized $H_2S$ in waters where the pH is not low.

TABLE 1

Approximate Proportions of $H_2S$ and HS in Dissolved Sulfide

| pH | Proportion of un-ionized $H_2S$ | Proportion of $HS^-$ |
| --- | --- | --- |
| 5.0 | 0.99 | 0.01 |
| 6.0 | 0.91 | 0.09 |
| 6.2 | 0.86 | 0.14 |
| 6.4 | 0.80 | 0.20 |
| 6.6 | 0.72 | 0.28 |
| 6.8 | 0.61 | 0.39 |
| 7.0 | 0.50 | 0.50 |
| 7.2 | 0.39 | 0.61 |
| 7.4 | 0.28 | 0.72 |
| 7.6 | 0.20 | 0.80 |
| 7.8 | 0.14 | 0.86 |
| 8.0 | 0.09 | 0.91 |
| 8.2 | 0.059 | 0.941 |
| 8.4 | 0.039 | 0.961 |
| 8.6 | 0.025 | 0.975 |
| 8.8 | 0.016 | 0.986 |
| 9.0 | 0.010 | 0.99 |

Toxicity of $H_2S$

Nearly everyone is familiar with the rotten egg odor of $H_2S$ in its natural occurrences. Because of this familiarity there has been a general lack of appreciation of its toxic character, and many deaths have resulted from carelessness in dealing with it. The threshold odor concentration of $H_2S$ is very low; between approximately 1 and approximately 10 mg/l. It is potentially very dangerous because its smell is quickly lost as the concentration increases. In oil refineries, tanneries, viscose plants, and many other chemical industries, workers have occasionally been exposed to $H_2S$ in concentrations that have resulted in death, and there have been many deaths in sewers on this account. Even the $H_2S$ from swamps and from natural hot springs can be deadly. Several lives have been lost as a result of bathing in hot sulfurous spring waters in closed rooms. There is evidence that a concentration of approximately 0.03% (300 parts per million) of $H_2S$ in the air has caused death. It should be noted that this is the concentration that could arise from water containing approximately 1 mg/l of unionized $H_2S$.

Other Forms of Sulfide in Waste Waters

Up to this point the discussion has been about hydrogen sulfide and its ionized form, HS. Sulfur can combine with metals too, producing compounds which are generally insoluble, such as zinc sulfide, ZnS, two copper sulfides, CuS and $Cu_2S$, several iron sulfides, etc. In all such combinations, as well as in $H_2S$ and $HS^-$, sulfur is in an electronegative state. In this state it is simply called sulfide.

In wastewaters of normal pH values (approximately 6.5 to 8) and/or circumneutral pH values, sulfide can be present partly in solution as a mixture of $H_2S$ and $HS^-$, and partly as insoluble metallic sulfides carried along as part of the suspended solids. In analyses of wastewaters, a distinction can be made between dissolved sulfide and insoluble sulfide. The sum of these forms can be called total sulfide. The concentrations can be expressed in terms of the sulfur content. The amount of insoluble metallic sulfide ordinarily does not exceed approximately 0.2 to 0.3 mg/l if the sewage is of residential origin, but the amount can be larger in sewers containing trade wastes.

Sulfide in wastewaters can react with dissolved oxygen, mostly by biological processes. Under the conditions prevailing in most sewers, the principal biological oxidation product is thiosulfate. If oxidizing bacteria are abundant in the wastewater, and dissolved oxygen is also present, sulfide can be oxidized at a rate of approximately 1 mg/l in approximately five minutes, but in less active sewage, as for example fresh domestic sewage, the same reaction can take approximately one hour. Sulfide also can react chemically with dissolved oxygen, that is, without the intervention of bacteria. This reaction can produce a variety of products, including sulfur, thiosulfate, sulfite, sulfate, and others. The rate of reaction can depend greatly on the presence of catalysts such as iron ions and the products produced can be influenced by the pH value.

$H_2S$ that escapes as a gas from solution in a sewer can be oxidized on exposed surfaces. If the surfaces are quite dry, free sulfur can be formed, but under moist conditions a species of bacteria named *Thiobacillus concretivorus* can oxidize it to sulfuric acid (which can cause corrosive damage to vulnerable materials) by the reaction:

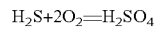

$$H_2S+2O_2=H_2SO_4$$

The process of oxidation of hydrogen sulfide can be a complex series of reactions involving many members of the species *Thiobacilli*, each with its own optimum growth rate at a given pH value. Some of the *Thiobacilli* can remain active in solutions containing up to approximately 7% of $H_2SO_4$ (pH approximately 0.2). The whole process of oxidation of hydrogen sulfide by bacteria and the factors which influence the bacterial corrosion of concrete in water can be complex.

The Occurrence of Sulfide in Sewage

Sewage can contain bacteria, sulfate, and/or organic matter, so it can have the elements required for sulfide generation. One further condition might be necessary. The reduction of sulfate to sulfide probably can occur only under anaerobic conditions. In the absence of dissolved oxygen, nitrate can provide oxygen for bacteria and can thus prevent septic conditions from developing. When all the "oxygen" provided by the nitrate anions has been consumed by the facultative anaerobic bacteria, the conditions can become strictly anaerobic. This is a state that can develop in sewage, because many kinds of bacteria can be present that can rapidly consume dissolved oxygen and "oxygen" from nitrate. However, if the sewer is partly filled, the water surface exposed to the air can absorb oxygen. The rate of absorption can be slow, and the bacterial action can deplete it to concentrations of approximately a few tenths of a mg/l, or sometimes only approximately a few hundredths. Still, where any dissolved oxygen or nitrate at all is present there might be no reduction of sulfate.

A layer of slime can build up on the submerged pipe wall in a sewer, very thin where the stream is swift, but a millimeter or more in thickness where it is slow. The slime layer can be the site of intense micro-biological action, and it is here that anaerobic conditions can develop, and that the most active sulfate reduction and/or sulfide generation can take place.

There can be an aerobic (oxygen containing) zone in the slime layer where it is in contact with the flowing stream. The aerobic zone might extend into the slime layer to a depth of only approximately 0.1 mm, but it can extend considerably deeper if the stream carries several mg/l of dissolved oxygen. Sulfate and part of the organic nutrients can diffuse through the aerobic zone and into the deeper layers, thus supplying the requirements of bacteria that produce sulfide. Thus, sulfide generation can occur even when the stream contains dissolved oxygen, but is unlikely to occur if nitrate were present, as nitrate will likely diffuse into the lower layers of the slime and provide a source of oxygen to prevent septicity. The zone where sulfide is produced might be only approximately a few tenths of a millimeter in thickness. The sulfate and/or the organic nutrients can be used up in that distance and unless the slime layer is quite thin, there can be a deeper layer that is relatively inactive.

Sulfide diffusing out of the zone where it is produced can be, at least in part, oxidized to thiosulfate in the aerobic zone. If much oxygen is present, all of the sulfide can be oxidized there, but if the oxygen condition is low, then part of the sulfide can escape from the slime layer into the stream. When this condition prevails, the sewer can show "sulfide build-up", meaning that the concentration in the stream can progressively increase as the sewage moves down the pipeline. However, oxidation can occur to some extent in the stream, and some $H_2S$ can escape to the atmosphere, so the concentration can tend to approach a steady state condition where the losses are equal to the rate that sulfide is produced.

Figure 3:
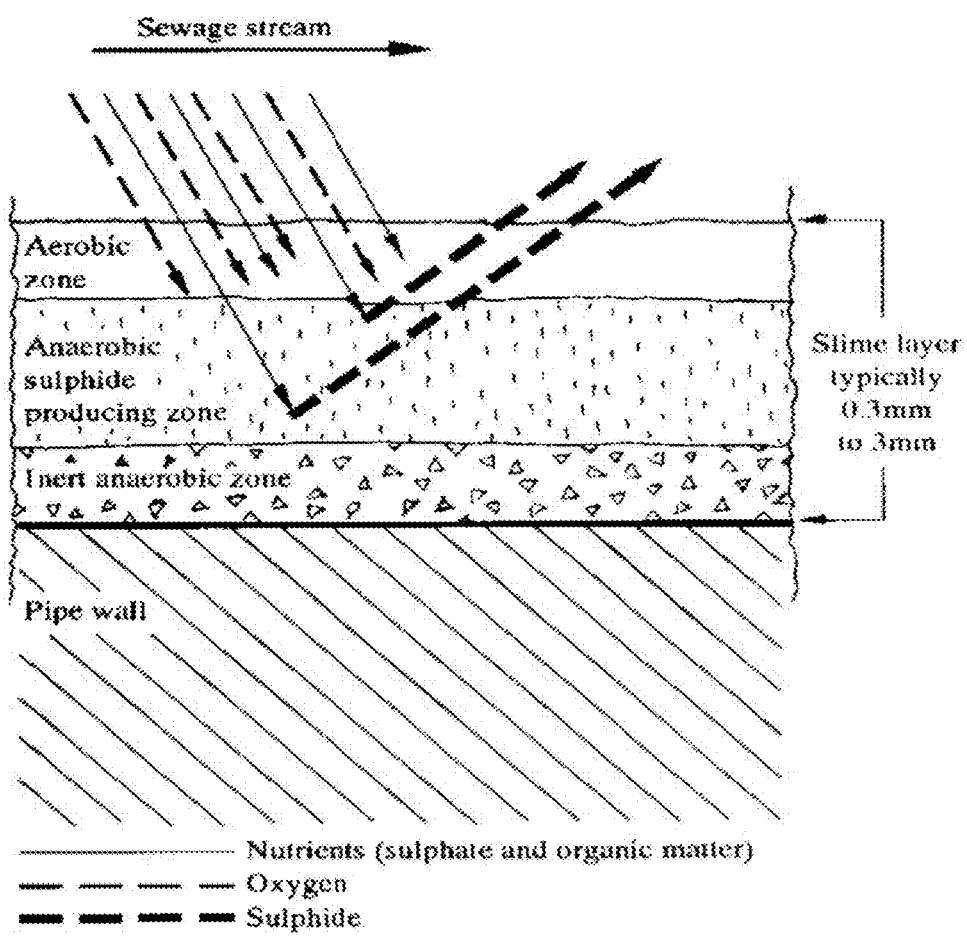
FIG. 3 is a block diagram of an exemplary embodiment of a system 3000.

FIG. 3 shows a cross-sectional view of the slime layer of a sewer, pictured on a magnified scale. Oxygen, organic nutrients, and sulfate are seen to be diffusing into the slime layer. Oxygen and part of the organic nutrients can be used up in the aerobic zone. Sulfate and the remainder of the organic nutrients can diffuse farther, reaching the anaerobic zone. A dense population of anaerobic bacteria can be found there, especially the species *Desulfovibrio desulfuricans*, which can bring about the reaction that produces sulfide, at a rate determined by the rate that the nutrients can diffuse into that zone. Sulfide can diffuse outward from the slime layer, part of it being oxidized in the aerobic zone and/or part escaping into the stream.

The concentration of oxygen necessary to prevent any sulfide build-up can vary widely, depending upon a number of conditions. The velocity of the stream can one factor. At low velocity, the motion of the water is not necessarily very efficient in carrying oxygen to the slime layer, and under these conditions a higher oxygen concentration can be necessary if sulfide is to be barred from the stream compared to when the stream is swift. For example, approximately 0.5 mg/l of dissolved oxygen might be needed to prevent sulfide build-up, but under some conditions as much as approximately 1.0 mg/l, or even more, might be required.

A characteristic of the generation of sulfide in sewers can be its sporadic occurrence. In the early decades of this century, this seemingly random appearance of sulfide in sewers was the subject of much speculation. Now that the mechanism of sulfide build-up is better understood, the potential reasons are clearer. A major determining factor in sulfide build-up can be the amount of oxygen (dissolved and/or available from nitrate) in the sewage stream. If the oxygen concentration is high, there likely will be no sulfide build-up; if it is low, then sulfide build-up might occur.

The rate of sulfide production can be influenced not only by oxygen concentration, but by other factors as well. The rate can increase with increase of temperature, and it can depend in a complex way on the concentrations of organic nutrients and of sulfate. The rate of sulfide production can be limited by a scarcity of either sulfate or organic matter. Since both can be consumed in the biological reactions that produce sulfide, they can be required in a certain ratio. If there is an excess of organic nutrients, then the rate of sulfide production can be limited by the amount of sulfate and if there is an excess of sulfate, the rate can be limited by the amount of organic nutrients.

The organic nutrients available for sulfide production in sewers have not been identified, but they likely are in solution, since they tend to diffuse to the sulfide producing zone. It has been assumed that in typical municipal sewage the organic nutrients for sulfide generation are proportional to the biochemical oxygen demand or BOD and/or to the chemical oxygen demand or COD.

The effects of velocity on sulfide build-up can be complex. At low velocity, solids can settle and/or move slowly and/or intermittently along the bottom. The loosely deposited solids quickly can become depleted of oxygen, and sulfide generation can proceed until the depletion of sulfate and/or organic nutrients. If the solids are then disturbed by the motion of the water, sulfide can be released into the stream in greater amount than would result from the process. Higher velocities can prevent this from happening, and also can increase oxygen absorption into the stream, increase the rate of oxygen transfer to the slime layer, and/or shorten the time that the sewage spends in transit, any of which can lead to lower sulfide concentrations. On the other hand, at low velocities, and especially if the sewage is intermittently stationary, as is usually the case in pressure mains from pumping stations, nutrients can become depleted in the water adjacent to the slime layer, thus retarding sulfide generation. An increase of velocity in a completely filled pipe can, up to a point, increase sulfide generation.

An equation could be written that would express the rate of sulfide build-up as a function of the various factors that influence generation by the slime layer and the losses by oxidation and escape to the air. Such an equation likely would not be very useful, because of the difficulty of securing the input information that would be required. An important value might be the dissolved oxygen concentration. An accurate prediction of dissolved oxygen could require a detailed history of the sewage for an hour or so upstream from a point where a prediction of sulfide build-up would be attempted. Absorption of oxygen at the surface of the stream can be predicted if slope, pipe size, and flow quantity are known, but extra oxygen can be added at junctions, drops, and/or other points of turbulence, and it can be difficult to predict the rate at which oxygen will be consumed.

One approach to the problem of predictions is to limit such attempts to the restricted case that the unpredictable factors are favorable for build-up. That is to say, it can be assumed that sufficient sulfate is present so that it is not limiting, that oxygen concentration is low, that no nitrate is present either derived from the water supply or from industrial discharges, and that there is no toxic condition or other factor that inhibits the action of the slime layer.

To predict sulfide build-up, quantitative forecasts might be possible for the restricted case of sewage in pressure mains and other completely filled pipes, where the sewage is denied any contact with air. Sewage pumped into a pressure main often contains dissolved oxygen which can result from its fall into the wet well and/or from other causes, and on this account there might be no sulfide build-up initially, but after a time the dissolved oxygen and nitrate "oxygen" can be completely depleted and then the maximum sulfide producing capability of the slime layer can be displayed.

When the sewage becomes completely anaerobic, sulfide generation can occur not only at the pipe wall but also in the stream. The amount produced in the stream, however, can be small in comparison with the output by the slime layer except in very large pipes.

In a small pipe of, say, approximately 100 mm diameter, troublesome sulfide concentrations can arise even where the retention time of the sewage in the main is as little as approximately ten minutes. In larger mains the build-up rate can be slower, but significant amounts can be produced within approximately 20 to approximately 30 minutes in a pipe of approximately one meter diameter.

The addition of nitrate, via an aqueous sodium nitrate solution, to sewage systems, waste treatment plants, and/or other industrial waste applications containing dissolved hydrogen sulfide, can result in the elimination and/or substantial reduction of the hydrogen sulfide, and/or the elimination of other "minor" odors associated with other sulphur-containing compounds.

Although not intended to be limiting, it is currently believed that the addition of nitrate can provide an oxygen source that promotes the growth of naturally occurring bacteria, which can utilize in their metabolism the sulfur tied up as hydrogen sulfide. It has been demonstrated, both in lab jar tests and in an actual sewage collection system test, that dosing sewage containing over approximately 50 mg/L of dissolved hydrogen sulfide with a sodium nitrate solution can reduce the dissolved hydrogen sulfide to less than approximately 0.1 mg/L. Along with this phenomena, a significant reduction in sewage biological oxygen demand, BOD, of up to approximately 70%, and overall "sweetening", i.e., removal of other minor odors, of the sewage has been observed. These phenomena might be the results of the biological process promoted by the nitrate addition.

Because the necessary reaction is currently believed to be biochemical, it typically will not occur within a sterile solution, i.e., naturally occurring bacteria probably must be present. Moreover, the removal of hydrogen sulfide typically is not instantaneous. According to the inventor's tests, an "incubation" period can be used to culture the bacteria. That incubation period can range from approximately 8 to approximately 96 hours, including every value and subrange there-between, such as approximately 24 to approximately 48 hours. An additional period can be used for sulfide removal, that period ranging from approximately 1.5 to approximately 20 hours, including every value and subrange there-between, such as approximately 3 to approximately 12 hours.

Nitrate and nitrite can be strong oxidizing agents. Therefore, it is suspected that both nitrate and nitrite can pull electrons away from susceptible reduced compounds such as a chelated ferrous iron molecule. In removing an electron from a ferrous ion a resulting ferric ion can be created. Ferric iron can react with sulfide ions in a reaction that sequesters an electron from the sulfide ion. In wastewater treatment, ferric salts can be used to sequester sulfide in solution, thus rendering the sulfide unavailable to create hydrogen sulfide gas.

Regeneration of ferric chelates within an anaerobic waste treatment system can be practically done with oxygen in most cases. Injected and/or diffused oxygen can have the ability to oxidize (regenerate) the ferrous chelates to ferric chelate under anaerobic conditions while providing an added benefit in providing oxygen to the wastewater for promoting aerobic digestion and/or to prevent the formation of sulfide within an otherwise anaerobic environment. Regenerated ferric chelate can take electrons from the sulfide molecules present, thus oxidizing it to elemental sulfur at the circum-neutral pH (approximately 6.0 to approximately 8.5) that can be necessary for the reaction.

Figure 4:
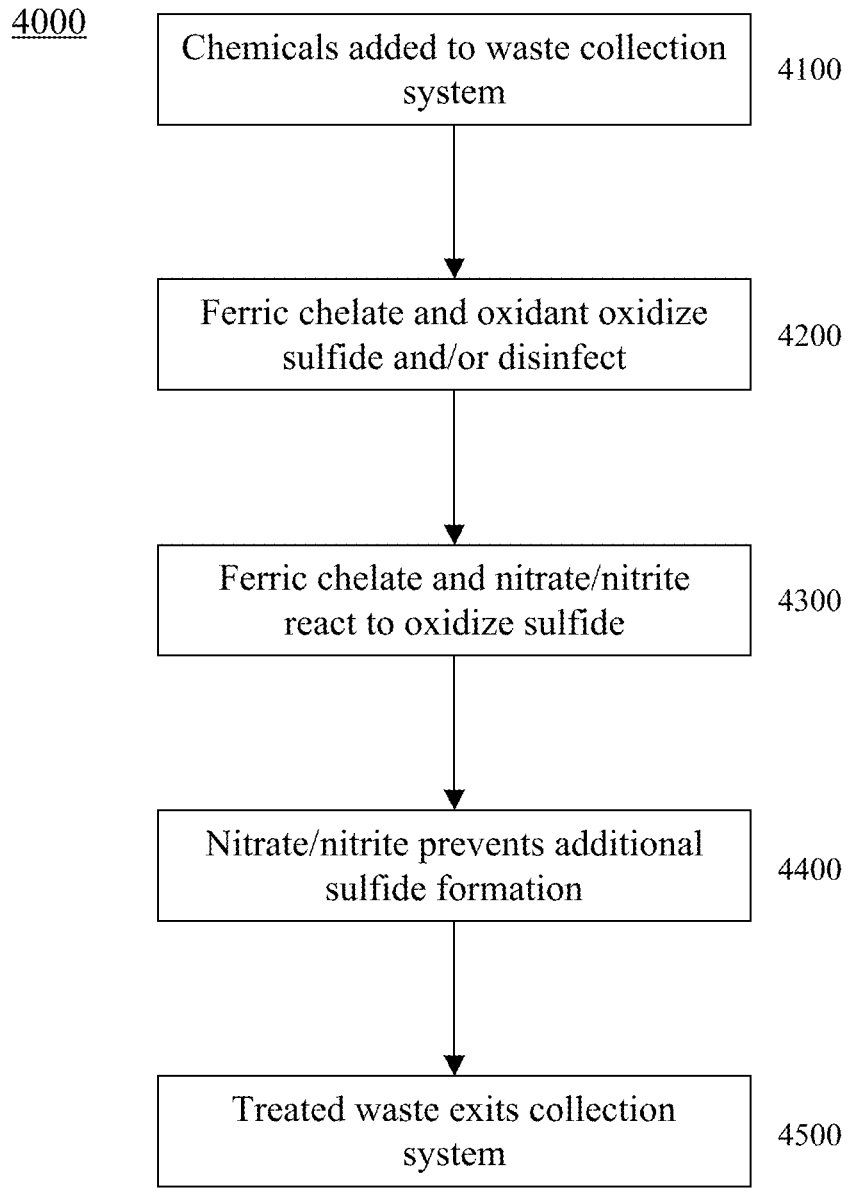
FIG. 4 is a flowchart of an exemplary embodiment of a method 4000.

An exemplary embodiment of the above-described process is shown in FIG. 4. In activity 4100, chemicals, such as a liquid ferric chelate solution and/or a liquid oxygen solution can be added to a waste collection system. At activity 4200, the ferric chelate can quickly react to oxidize sulfide. At activity 4300, the ferrous chelate that is generated in sulfide oxidation can then react with oxygen to regenerate ferric chelate for further sulfide oxidation. At activity 4400, the remaining oxygen can prevent formation of additional sulfide. At activity 4500, the treated waste can exit the collection system.

Pure oxygen can purchased in liquid form for application to a treatment system from a number of commercial suppliers, such as Air Liquide (Holland, Ohio), Praxair (Loveland, Colo.), and/or Air Products (Conyers, Ga.).

At standard temperature and pressure, oxygen is a colorless, odorless gas with the molecular formula O2, in which the two oxygen atoms are chemically bonded to each other with a spin triplet electron configuration. This bond has a bond order of two, and can be described as a double bond or as a combination of one two-electron bond and two three-electron bonds.

Triplet oxygen is the ground state of the O2 molecule. The electron configuration of the molecule has two unpaired electrons occupying two degenerate molecular orbitals. These orbitals can be classified as antibonding (weakening the bond order from three to two), so the diatomic oxygen bond is weaker than the diatomic nitrogen triple bond in which all bonding molecular orbitals are filled, but some antibonding orbitals are not.

Treatment of Sulfide within a 14.7 Mile Force Main
Background

A nominal 20-inch diameter concrete force main from West County Wastewater Treatment Plant (WCWWTP) in Jefferson county, Kentucky, carries waste biosolids (approximately 1%) to Morris Forman Wastewater Treatment Plant (MFWWTP) for further processing. The force main is approximately 14.7 miles in length and contains approximately 1.3 million gallons of biosolids at full capacity. The pump capacity for moving the biosolids from the WCW plant is rated at 1950 gpm or approximately 117,000 gph. At this pump rate, a complete flushing of the line would take approximately 11.11 hours of continuous run-time. However, continuous transmission of biosolids is not done since the WCW plant typically generates approximately 600,000 gallons of waste biosolids per day.

Daily run times for biosolids transmission ranges from 5-12 hours per day with a typical run time of approximately 5.5 hours per day. Depending on the run times, biosolids retention times can range from 24 hours up to 96 hours but, more typically, are within the force main for approximately 48 hours. The biosolids empty into an aerated solids receiving tank (SRT) at Morris Forman. The biosolids are pumped from the SRT to either the anaerobic digesters or to the headworks of the Morris Forman plant when bypassing of the SRT is required.

Because the retention time is normally at least 48 hours, high concentrations of sulfide are generated under the anaerobic conditions within the force main. This situation is further exacerbated by the high oxygen demand of the waste biosolids being transmitted.

The resulting hydrogen sulfide generation within the atmosphere of the aerated SRT receiving this waste often exceeds concentrations above 700 ppm with average of 400-500 ppm. Total sulfide within the biosolids often exceeds 15 ppm.

The headspace air from the SRT, in addition to air from a biosolids decanting process and centrifugation room are pulled through two bio-scrubbers designed to scrub the air of hydrogen sulfide and associated odorous organic compounds. Under normal loading the bio-scrubbers do an adequate job of achieving <0.5 ppm hydrogen sulfide. However, during the daily force main biosolids transmission cycles from the WCW plant, spikes of hydrogen sulfide create a situation that overloads the bio-scrubbers. This results in hydrogen sulfide and associated organic odors escaping the scrubbers above the recognized limits for threshold odor detection. Untreated odorous gases from the bio-scrubbers combined with other fugitive emissions from the clarifiers, headworks, and solids handling is primarily responsible for the offensive odor that escapes the plant grounds to generate odor complaints from the surrounding neighborhoods.

In addition to the significant odor issues associated with the biosolids transmission from WCW plant, hydrogen sulfide related corrosion within the concrete transmission line is of concern. Failures are common-place and sections of piping have to be replaced regularly. The transmission line contains numerous gas vents (pressure relief valves) designed to vent gas pressure as it builds within the line. Failure of the pressure relief valves consistently allows oxygen into the line. As oxygen enters the line, bacteria, primarily *Bacillus concretivous*, create sulfuric acid as they proliferate in the vicinity of the oxygen source. The resulting sulfuric acid formation degrades the concrete piping, resulting in numerous collapses within the line over the years.

Brief Assessment of Process Findings

The Endurox (combination of Fe-MGDA and nitrate) Process combines three treatment strategies that can control sulfide and/or sulfide generation within wastewater transmission force mains. The process can utilize an organic catalyst (Fe-MGDA) that can react with hydrogen peroxide to form hydroxyl/free radicals. Hydroxyl/free radicals can be potent oxidizers that appear to suppress the population of sulfide forming bacteria that can exist naturally within wastewater. Sulfide that actually does form down-line within a force main can be oxidized by a reaction involving the catalyst and a mild oxidant (nitrate) within the Endurox product. This reaction can be viable for lengthy periods of time within force mains but is not necessarily effective beyond 12 hours of anaerobic conditions at the dosages prescribed. The active life of this particular part of the process can be based on the dose rate of the Endurox additive. Finally, nitrate can be utilized preferentially by sulfide producing bacteria prior to the consumption of sulfate/sulfite as an oxygen source by those organisms. Because this substance can be used preferentially, sulfide production does not necessarily proceed until it is depleted. However, under the conditions of the West County Force Main study, all nitrate and hydrogen peroxide seemed to be exhausted after 12 hours of contact. While the combination of these treatment strategies appears to have resulted in unprecedented success in the treatment of sulfide within force mains, the conditions in West County Force Main was well beyond its designed capability. However, the pilot study was successful, leading the investigator to surmise that oxygen entering the line through faulty air relief valves could have been a factor, although this theory has not yet been proven, and is believed to be indeterminable (without extraordinary measures) given the complex and dynamic conditions believed to be present in this very long pipeline.

West County Force Main Pilot Study

Summary of Pilot Study Test Conditions

Several treatment scenarios were conducted to determine a cost effective treatment approach for reducing sulfide. Dosages of Endurox (0.05 M Fe-MGDA and 4.2 M nitrate) and 50% hydrogen peroxide were applied into the waste biosolids leaving the WCW plant within the force main. Injections of treatment agents were metered into a water line using Walchem and Pulsafeeder diaphragm metering pumps. The water line containing the treatment agents was directed into the biosolids transmission line through a small valve placed on the side of the transmission line as it left WCW plant. For pilot testing after week one, the metering pumps were electronically paced with the biosolids transmission pump so as to begin feeding when the biosolids pump cut on and stop feeding when it was turned off. Before this situation was available to the investigator, the metering pumps were cut on with timers that roughly met the schedule for pumping of biosolids.

Testing for the effect of the process on sulfide control was conducted at the influent to the Solids Retention Basin (SRT) and in the air space above the SRT at the Morris Forman Wastewater Plant.

Alteration of the BioSolids Retention Time

Run times and retention times probably should be clearly understood during treatment events in order to properly design dosage requirements. A typical biosolids transmission might runs for 6 hours on day one resulting in approximately 702,000 gallons of biosolids being pumped into the force main. This plug of biosolids could then typically sit within the pipe without moving until the following afternoon when pumping starts again. If the follow-on transmission of biosolids runs for 5 hours on day two, approximately 585,000 gallons of biosolids will have been pumped. The total now transmitted during the two days of pumping comprises approximately 1,287,000 gallons of biosolids. Biosolids pumped on day one will not begin to emerge from the system into the SRT until the following day. This material will now have been in the pipe for over 48 hours.

The flow retention time for biosolids was not altered from the existing pumping schedule during week one of pilot testing. Biosolids within the force main during this period of study maintained very long retention times. During the second week of testing, plant personnel at the WCW plant preceded each day's biosolids pumping event with flow from the plant influent. Enough influent water was pumped so as to reduce the retention time of the biosolids to a predictable retention time schedule of approximately 24-30 hours. Operators at Morris Forman diverted the plug of influent water to the headworks of the plant so as not to introduce sulfide-laden influent into the SRT. The flow was re-diverted to the SRT once biosolids appeared in the bypass water. In this way, the investigator could test the effect of Endurox on biosolids with more predictable retention times within the force main. Since this is a technique that had been utilized by the WCW plant and Morris Forman historically, it was reasoned that it could be re-deployed for future to help minimize treatment cost for the biosolids.

Description and Results from the Endurox Treatment Studies

Endurox Treatment Goals

Goals considered for the Endurox pilot study were as follows:
significantly reduce $H_2S$ from the WCW plant force main biosolids at the Morris Forman Sludge Retention Tank;
provide corrosion protection to maintain the long-term integrity of the force main;
significantly reduce $H_2S$ spikes in bio-scrubber influent; and/or successfully prove that sulfide can be economically treated in a transmission line with excessive retention times using the Endurox Process.

Baseline Study

On August $2^{nd}$, an odalog $H_2S$ meter was hung inside the SRT to begin collecting raw data. Aqueous samples were also collected and total sulfides were analyzed using a Hach 850 colorimeter.

Figure 5:
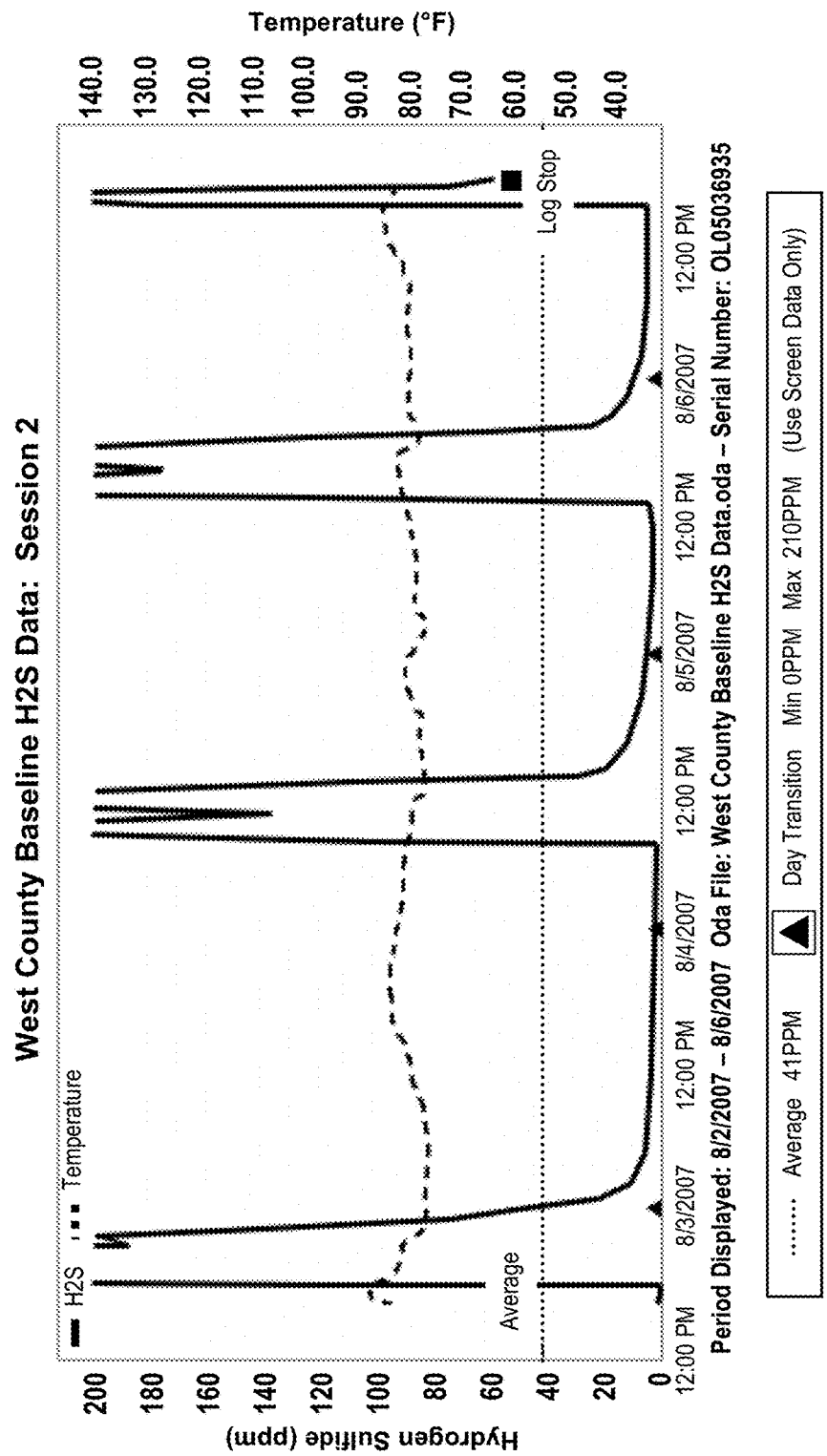
FIG. 5 is a plot of baseline data for a pilot study.
Figure 6:
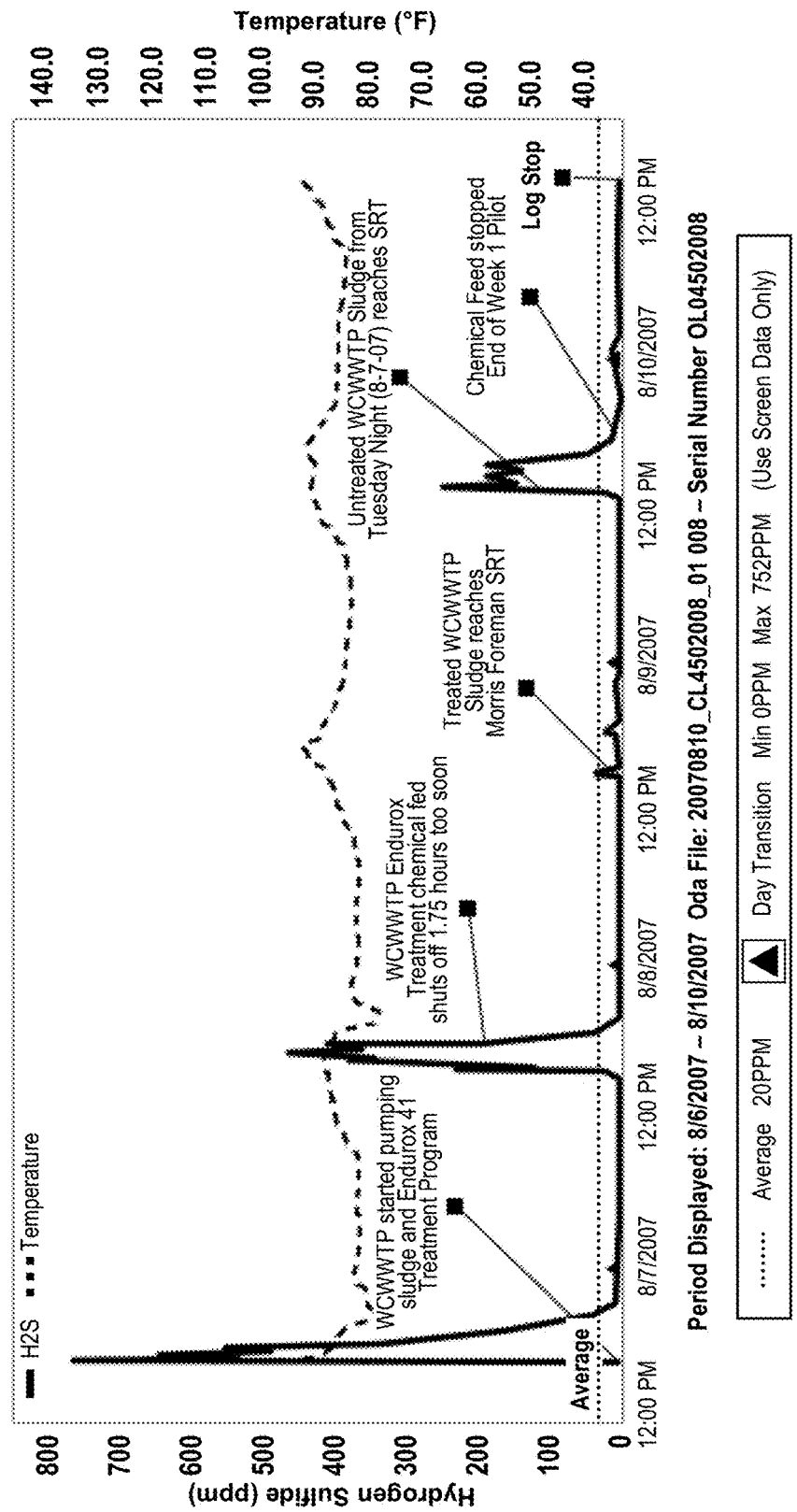
FIG. 6 is a plot of data obtained utilizing an exemplary embodiment.
Figure 7:
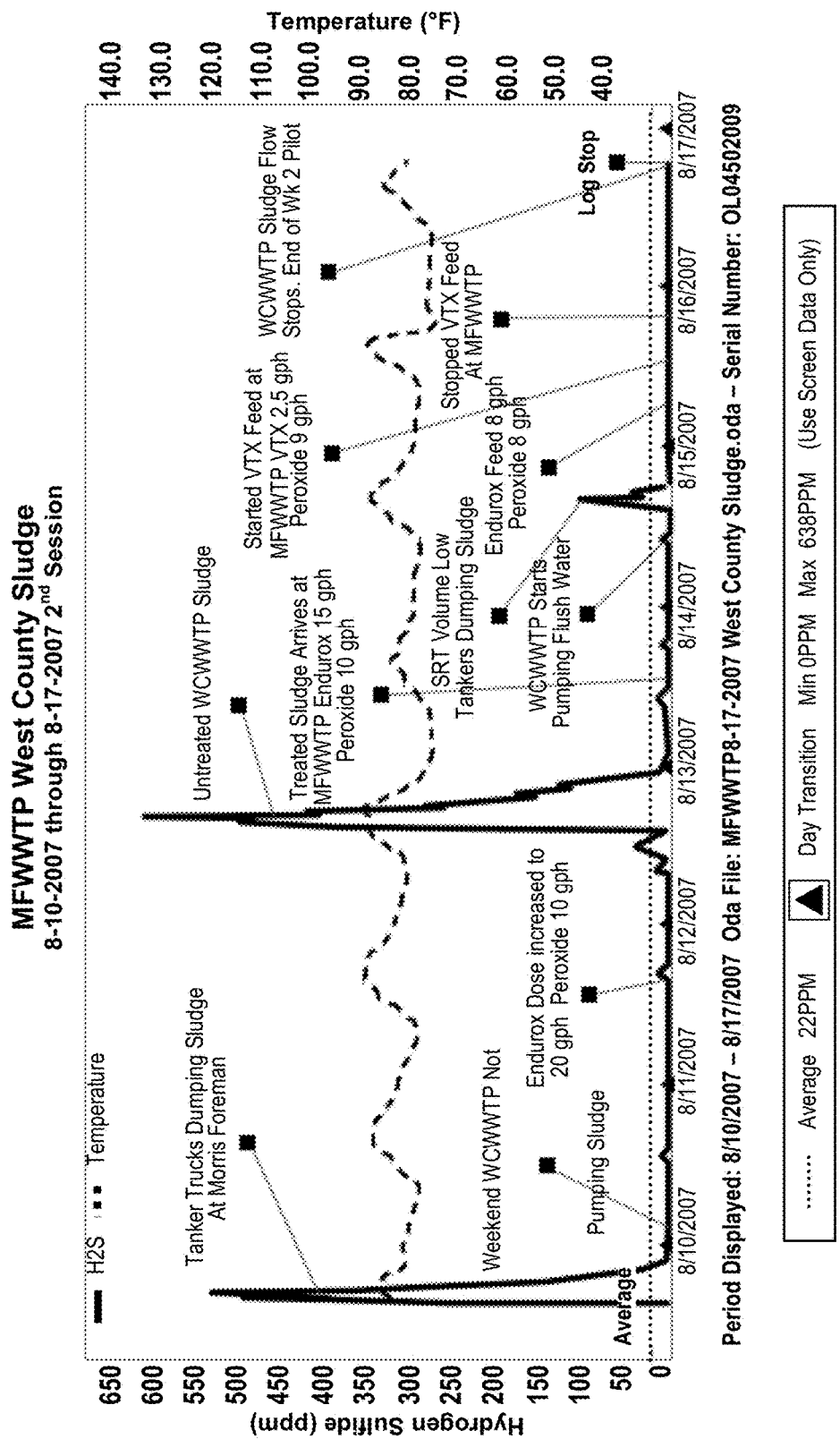
FIG. 7 is a plot of data obtained utilizing an exemplary embodiment.
Figure 8:
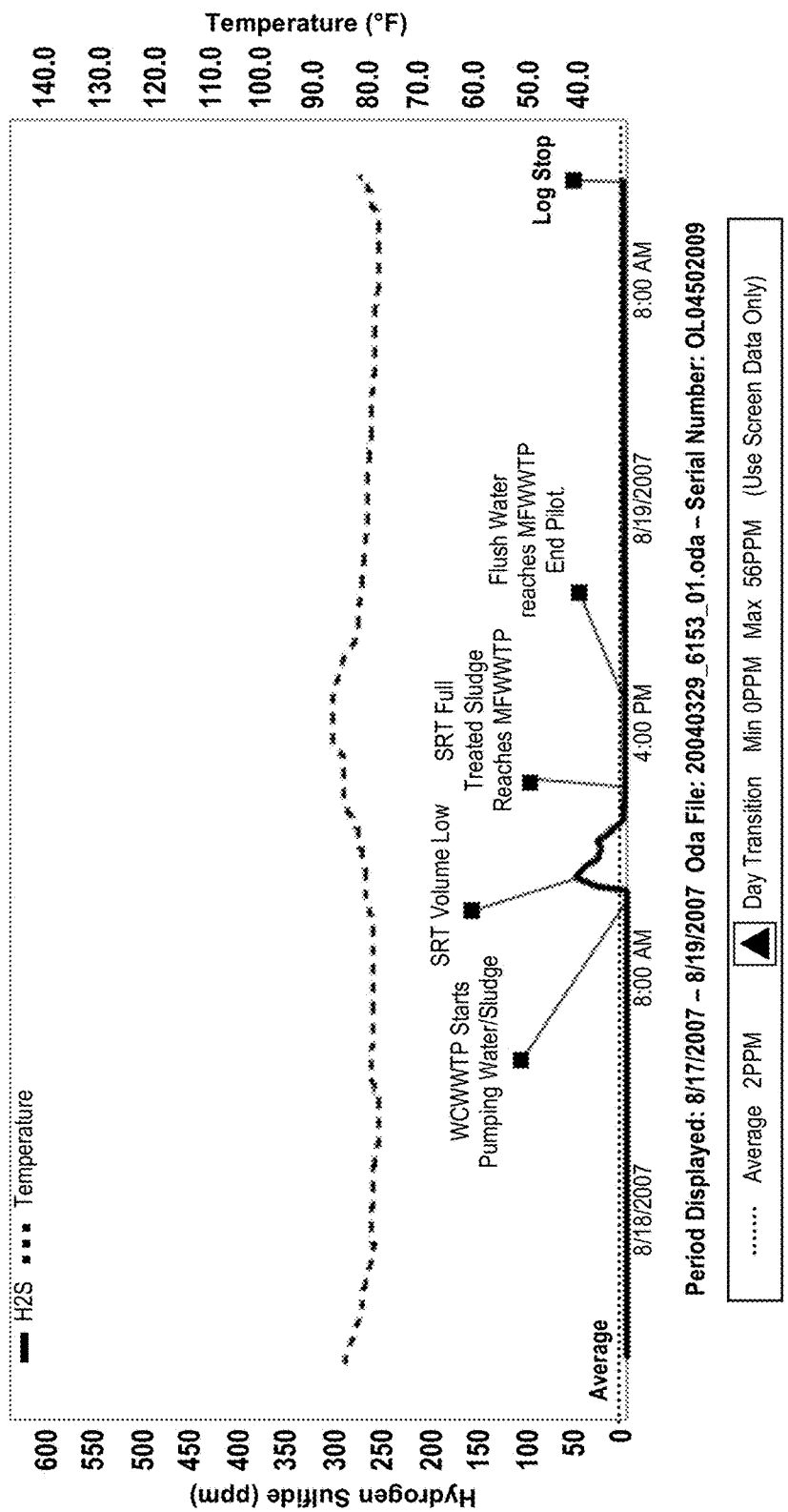
FIG. 8 is a plot of data obtained utilizing an exemplary embodiment.

FIG. 5 depicts the Odalog graph for the days leading up to the treatments using Endurox. This graph can be referenced during comparisons to Odalog graphs during periods of treatment. Total sulfide data baseline sample data can be viewed in Table 2.

TABLE 2

Baseline Total Sulfide Data
Untreated Sludge Samples

| Date | Time | Total Sulfide |
|---|---|---|
| Aug. 6, 2007 | 4:00 PM | 14 mg/L |
| Aug. 6, 2007 | 4:15 PM | 15 mg/L |
| Aug. 6, 2007 | 4:30 PM | 16 mg/L |

Endurox Data Collection

For periods of Endurox treatment, Odalog graphs are depicted individually to reflect the treatment efficiency witnessed for each individual Endurox dosage scenario. Tables of data for total sulfide within the water during treatments will also be depicted individually with each Endurox dosage study.

It should be mentioned that the weather during the two-week pilot study included daily high temperatures of approximately 100 Fahrenheit and no rainfall. These conditions can be considered very favorable for sulfide production.

Endurox Dosing Schedule

The following table depicts the dosing schedule for Endurox tests:

TABLE 3

Endurox Process Dosage by Day Treated
Dosage
Gallons per Hour

| Date Tested | Endurox | 50% $H_2O_2$ |
|---|---|---|
| 8/6- 8/9 | 10 | 5 |
| 8/13 | 20 | 10 |
| 8/14 | 15 | 10 |
| 8/15 | 12 | 10 |
| 8/16-8/17 | 8 | 8 |

Endurox Treatment Results

On August $6^{th}$, the biosolids pump energized at 2:49 pm. Beginning dosages were 10 gallons per hour of Endurox and 5 gallons per hour of 50% $H_2O_2$. The biosolids pump ran approximately 6 hours. Therefore, 60 gallons of Endurox and 30 gallons of $H_2O_2$ were pumped respectively to treat 702,000 gallons of biosolids. The SRT was monitored during the cycle. Aqueous sulfide levels were taken and the odalog was observed. The air around the SRT was very offensive. The biosolids entering the SRT was the untreated biosolids material pumped Sunday from WCW plant. $H_2S$ levels in the SRT peaked at 750 ppm and total sulfide levels ranged between 14 mg/l and 16 mg/l respectfully within the wastewater.

On August $7^{th}$, the pump turned on at 3:29 pm. Dosage levels were unchanged. The pump ran for 4 hour and 10 minutes, thus 487,500 gallons of biosolids was pumped. The timer turned the chemical feed pumps off 1-hour and 45 minutes before the biosolids pump stopped. After two days of treatment, 1,189,500 gallons of biosolids had been pumped. However, only 984,250 gallons of biosolids were treated. Therefore, the treated and untreated biosolids had not arrived at the SRT at this time. Very high levels of $H_2S$ and other offensive odors were observed at the SRT.

On August $8^{th}$, the biosolids pump began running at 3:13 pm. Dosage levels of treatment chemistry remained unchanged. MSD personnel provided an electrical outlet connected to the biosolids pump starter. The chemical pumps then cycled on only when the biosolids pump was running. The biosolids pumps ran for 7.21 hours transmitting approximately 858,000 gallons of biosolids. Continuous monitoring at the SRT revealed significant reductions in $H_2S$ and general odor. The highest $H_2S$ level recorded was 29 ppm versus the 760 ppm recorded on 6 Aug. 2007 for untreated material. It was now apparent that Endurox usage was resulting in significant reductions in $H_2S$. $H_2S$ levels going into the bio-scrubbers were also decreasing from >100 ppm to an average of 65 ppm. This positive number was a reflection of hydrogen sulfide entering the bio-scrubbers from other sources.

On August $9^{th}$, the biosolids pump turned on at 1:31 pm. Once again, the dosages remained the same as the day before. The biosolids pump ran for 5.81 hours resulting in 679,770 gallons of biosolids pumped. $H_2S$ levels remained less than 3 ppm within the SRT until the 1.5 hours of untreated material from Tuesday, night (August $7^{th}$) came through. The spike registered for this untreated material resulted in an increase of $H_2S$ to 250 ppm. Diligent tracking of the flow indicated that this material was definitely the untreated material that was transmitted when the Endurox/peroxide pumps shut down early. This event provided additional proof that the material treated with Endurox exhibited significantly suppressed sulfide formation activity.

On August 10th, the biosolids pump turned on at 2:33 pm and ran for a total of 5.9 hours while pumping 690,300 gallons. $H_2S$ levels did spike briefly during the cycle. This was because tanker trucks from a satellite wastewater treatment plant were dumping sulfide-laden waste biosolids into the SRT.

WCW plant personnel indicated that they were not going to pump any biosolids over the weekend. Because the retention time would be higher than 96 hours, it was decided that it would be a potential waste of treatment chemicals to treat this material. It was also an opportunity to see extreme elevations of the sulfide after the waste was allow to sit in the pipe for an extended period of time.

TABLE 4

Sludge Total Sulfide Data
Sludge Samples

| Date | Time | Total Sulfide (mg/L) |
|---|---|---|
| Aug. 7, 2007 | 4:15 PM | 1.0 |
| Aug. 7, 2007 | 4:20 PM | 2.0 |
| Aug. 7, 2007 | 4:25 PM | 2.0 |
| Aug. 8, 2007 | 3:50 PM | 7.0 |
| Aug. 8, 2007 | 4:00 PM | 8.0 |
| Aug. 8, 2007 | 4:15 PM | 1.0 |
| Aug. 8, 2007 | 4:22 PM | 4.0 |
| Aug. 8, 2007 | 4:30 PM | 4.0 |
| Aug. 8, 2007 | 4:50 PM | 3.0 |

On August 13th, the biosolids pump turned on at 2:31 pm and ran for a total of 11.75 hours. A total of 1,374,750 gallons of biosolids were pumped. This volume exceeded the 1.3 mgd necessary to flush the line. The Endurox dose was increased to 20 gallons per hour and the $H_2O_2$ dose was increased to 10 gallons per hour, respectfully. The SRT was closely monitored and revealed $H_2S$ spikes over 625 ppm from untreated biosolids entering the SRT. This was untreated material from Aug. 10, 2007. Sulfide levels in the biosolids entering the SRT consistently hovered at 14 mg/l. There was considerable odor around the SRT.

TABLE 5

Sludge Total Sulfide Data
Sludge Samples

| Date | Time | Total Sulfide (mg/L) |
|---|---|---|
| Aug. 13, 2007 | 4:15 PM | 10.0 |
| Aug. 13, 2007 | 4:30 PM | 14.0 |
| Aug. 13, 2007 | 4:45 PM | 14.0 |
| Aug. 13, 2007 | 4:55 PM | 14.0 |

On August 14th, the biosolids pump began pumping at 2:18 pm and ran for 5.85 hours. A total of 684,450 gallons were pumped. Prior to pumping biosolids, MSD began pumping raw influent water from the headworks of WCW plant into the force main on Tuesday morning. The pumping continued from approximately 8:00 am to until 2:00 pm when the biosolids pump was ready to operate. The purpose of pumping water helped with controlling retention time. By pumping 400,000-600,000 gallons of water each day, the retention time for the biosolids was reduced to approximately 24-36 hours. By reducing the retention time, it is believed the chemical doses could be reduced significantly.

Therefore, the Endurox was reduced from 20 gph to 15 gph. The peroxide dosage remained unchanged at 10 gph.

In the SRT building, the force main comes into a room prior to emptying into the SRT. There a set of valves can be altered to bypass the SRT, sending the diverted contents to the headworks. For the rest of the pilot, the contents of the pipe was observed and when flush water began entering the SRT, the valves would be switched and the untreated water would be sent to the headworks. Conversely, when biosolids began entering the pipe, the valves directed the biosolids into the SRT tank. The reason for the switching is twofold. The flush water is untreated and will contain relatively high levels of sulfide that would interfere with the results. Secondly, wastewater would significantly dilute the biosolids within the SRT.

The SRT was monitored and revealed average $H_2S$ levels of 3-4 ppm and total sulfide levels of 2-4 mg/l. Very little odor was observed. The SRT levels were consistently high with the top of the biosolids only 1-2 feet below the odalog.

TABLE 6

Sludge Total Sulfide
Sludge Samples

| Date | Time | Total Sulfide (mg/L) |
|---|---|---|
| Aug. 14, 2007 | 4:25 PM | 3.0 |
| Aug. 14, 2007 | 4:35 PM | 4.0 |
| Aug. 14, 2007 | 4:55 PM | 3.0 |
| Aug. 14, 2007 | 5:05 PM | 2.0 |
| Aug. 14, 2007 | 5:15 PM | 3.0 |
| Aug. 14, 2007 | 5:30 PM | 2.0 |
| Aug. 14, 2007 | 6:00 PM | 3.0 |
| Aug. 14, 2007 | 6:15 PM | 4.0 |

On August 15th, MSD began flushing the pipe with influent water at 7:00 am. The biosolids pump turned on at 2:46 pm and the water pump was turned off. The biosolids pump ran 8.83 hours and pumped 1,033,110 gallons. The Endurox dose was reduced to 12 gallons per hour during this treatment event while the peroxide dose remained unchanged. The detention time for the biosolids pumped the day before was approximately 24 hours. The monitoring of the SRT continued with $H_2S$ levels ranging from 0-100 ppm. The elevation in hydrogen sulfide level was due to flush water entering into the SRT before the valves were changed as well as tanker trucks dumping biosolids. $H_2S$ levels were very low and total sulfide levels were averaging 2 mg/l for the majority of the treated test period.

TABLE 7

Sludge Total Sulfide
Sludge Samples

| Date | Time | Total Sulfide (mg/L) |
|---|---|---|
| Aug. 15, 2007 | 3:15 PM | <0.5 |
| Aug. 15, 2007 | 3:30 PM | <0.5 |
| Aug. 15, 2007 | 3:45 PM | 2.0 |
| Aug. 15, 2007 | 4:00 PM | <0.5 |
| Aug. 15, 2007 | 4:30 PM | 2.4 |
| Aug. 15, 2007 | 4:45 PM | 4.1 |
| Aug. 15, 2007 | 5:00 PM | 4.2 |
| Aug. 15, 2007 | 7:30 PM | 0.8 |

On August 16th, MSD began flushing the pipe at 10:50 am. The pumps turned on 2:08 pm and ran for a total of 6.21 hours and pumped 726,570 gallons of biosolids. The Endurox dose was reduced to 8 gallons and the peroxide dose was also reduced to 8 gph. On August 17$^{th}$, the biosolids pump began running at 2:53 pm and ran a total of 5.87 hours and pumped 686,790 gallons. The Endurox and H$_2$O$_2$ dosage remained at 8 gph each. MSD began flushing the line at 9:55 am and continued until 2:30 pm. Monitoring at the SRT showed 0-1 ppm of hydrogen sulfide in the air and <0.5 mg/l total sulfide in the biosolids. At the end of the cycle, sulfide levels in the biosolids began to increase. This may have been due to WCW plant pumping older biosolids from a different location. However, the small quantities of treatment chemicals added still maintained atmospheric H$_2$S levels of <1 ppm for the entire cycle. Treatment on this day concluded the active treatment dosages of Endurox chemistry.

On August 18$^{th}$, MSD began flushing the pipe at 10:30 am. The biosolids pump turned on at 2:49 pm and ran a total of 4.03 hours therefore pumping 471,510 gallons. No Endurox or H2O2 was added at WCW Plant. Monitoring at the SRT revealed low levels of H$_2$S and moderate levels of total sulfide from the dosage of Endurox delivered on the previous day. Monitoring continued until 5:08 pm when flush water began entering the SRT. The pilot was officially over.

TABLE 8

Sludge Total Sulfide Data
Sludge Samples

| Date | Time | Total Sulfide (mg/L) |
|---|---|---|
| Aug. 16, 2007 | 11:15 AM | <0.5 |
| Aug. 16, 2007 | 11:30 AM | <0.3 |
| Aug. 16, 2007 | 1:00 PM | <0.5 |
| Aug. 16, 2007 | 1:30 PM | <0.5 |
| Aug. 16, 2007 | 2:00 PM | <0.5 |
| Aug. 16, 2007 | 3:00 PM | <0.5 |
| Aug. 16, 2007 | 4:00 PM | <0.5 |
| Aug. 16, 2007 | 4:50 PM | <0.5 |
| Aug. 16, 2007 | 6:00 PM | <0.5 |
| Aug. 16, 2007 | 6:50 PM | <0.5 |
| Aug. 16, 2007 | 7:30 PM | <0.5 |
| Aug. 17, 2007 | 10:00 AM | 4.8 |
| Aug. 17, 2007 | 12:00 PM | <0.5 |
| Aug. 17, 2007 | 1:00 PM | <0.5 |
| Aug. 17, 2007 | 2:20 PM | <0.5 |
| Aug. 17, 2007 | 3:00 PM | <0.5 |
| Aug. 17, 2007 | 3:15 PM | 2.2 |
| Aug. 17, 2007 | 3:50 PM | 2.7 |
| Aug. 17, 2007 | 4:30 PM | 1.3 |
| Aug. 17, 2007 | 5:00 PM | 12.8 |
| Aug. 17, 2007 | 5:30 PM | 9.3 |
| Aug. 17, 2007 | 6:00 PM | 11.5 |
| Aug. 17, 2007 | 6:30 PM | 10.5 |
| Aug. 18, 2007 | 10:45 AM | 18.0 |
| Aug. 18, 2007 | 11:10 AM | 16.5 |
| Aug. 18, 2007 | 11:30 AM | 22.5 |
| Aug. 18, 2007 | 12:00 PM | 4.8 |
| Aug. 18, 2007 | 12:30 PM | 4.9 |
| Aug. 18, 2007 | 1:30 PM | 5.8 |
| Aug. 18, 2007 | 2:30 PM | 6.6 |
| Aug. 18, 2007 | 3:15 PM | 6.2 |
| Aug. 18, 2007 | 4:00 PM | 4.6 |
| Aug. 18, 2007 | 5:00 PM | 18.0 |

Conclusions

The pilot demonstrated that the Endurox Process could be applied to biosolids during a long retention time force main transmission to control odors associated with hydrogen sulfide. However, the extensive retention times within the force main from the West County Plant to the MSD Plant was far beyond the suspected capability of the Endurox Process. In actuality, the investigator expected to have a moderate reduction in sulfide entering the SRT at the MSD Plant. In retrospect, control at the levels demonstrated suggested that another factor might have been at play. Logically, nitrate within the line might be suspected of continued activity with the catalyst for the lengthy treatment success. However, it is now recognized that other factors might have been at play as well, such as the influence of oxygen leaking into the line at a faulty air relief valve. Under this scenario, oxygen might be responsible for re-triggering a ferrous chelate to ferric chelate reaction, thus creating a condition whereby sulfide might be oxidized by the ferric chelate, although it remains unknown and is believed to be indeterminable (without extraordinary measures) whether this reaction actually occurred in this pipeline.

Anaerobic Sulfide Treatment: Pure Oxygen Versus Pure Oxygen+Ferric MGDA Catalyst Objective A series of studies were conducted to determine the effect of ferric methylglycine diacetate (Fe MGDA) on the rate of treatment of sulfide within sulfide laden anaerobic wastewater when pure oxygen was injected into the test flask. Flasks injected with pure oxygen alone were compared to flasks injected with Fe MGDA and pure oxygen.

Procedure

Figure 11:
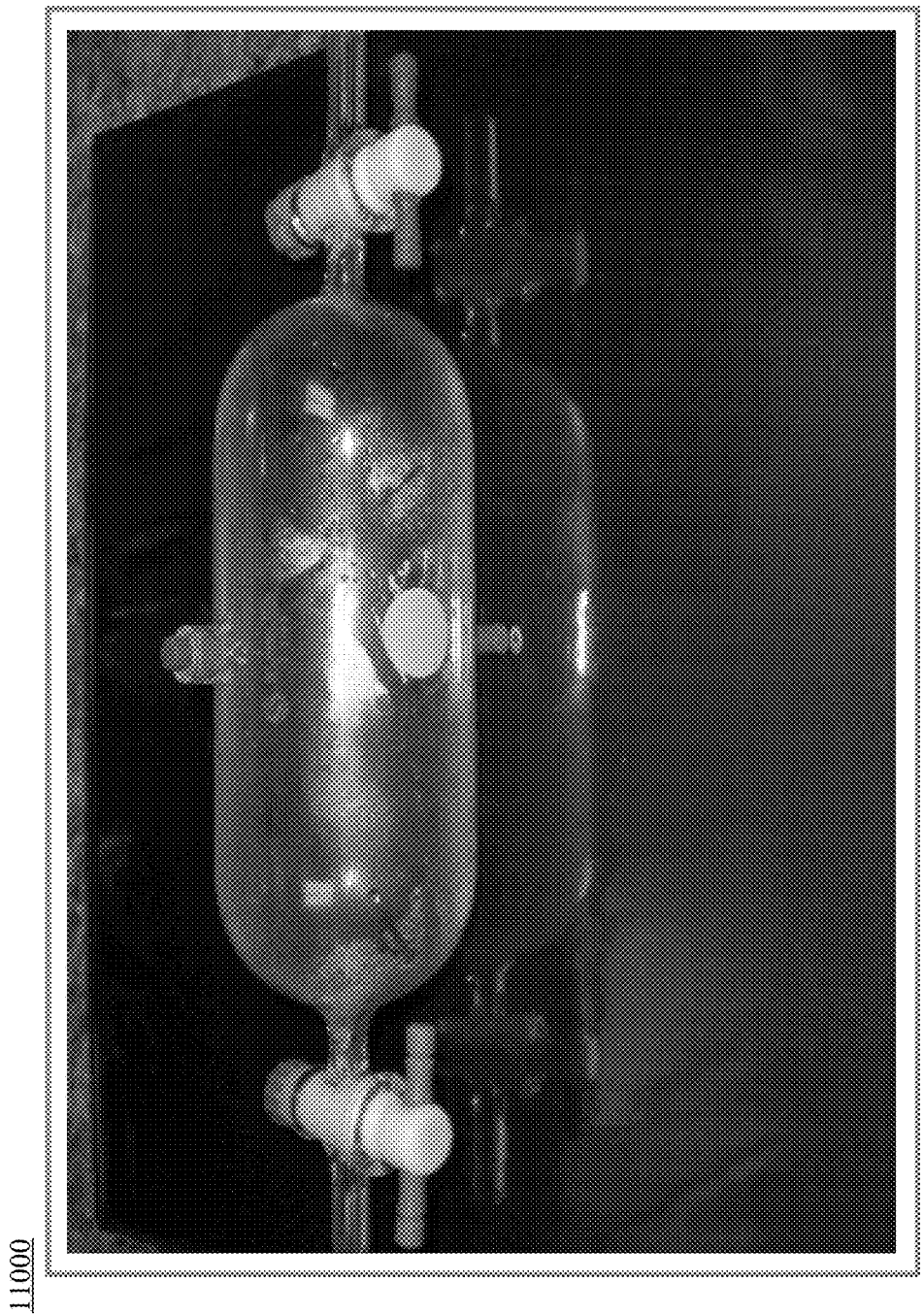
FIG. 11 is a photograph of an exemplary embodiment of a device 11000.

Three 300 milliliter Supelco test flasks were utilized for conducting the testing. Each flask had two valves and a single port for a septum to inject chemicals into the vessel. FIG. 11 shows a photograph of the vessel.

Each test flask was completely filled to zero headspace with wastewater from a municipal wastewater treatment facility that had been spiked with sodium sulfide. The pH of the wastewater was adjusted to neutral (approximately 7.0) with dilute hydrochloric acid after the addition of the sodium sulfide prior to filling the test flasks.

Test flasks were left at room temperature for two hours to assure that any oxygen within the wastewater in the test flasks was consumed prior to the study so as to mimic anaerobic wastewater conditions to initiate the study.

Bottled pure oxygen from Praxair Corporation was used in the study as a source of oxygen. Ten cubic centimeter samples (approximately 14 mg O2) were extracted from the oxygen cylinder in a glass syringe and injected into the 300 milliliter test flask to begin each study (total potential O2/liter approximately 45 mg/l). Oxygen was injected simultaneously with a slight opening of a valve on the cylinder so that wastewater could be displaced by the incoming volume of oxygen.

For studies conducted with Fe MGDA, oxygen was injected as described followed by injection of approximately 0.1 milliliters of approximately 0.03 M Fe MGDA. The control sample flask received no injection of any ingredients.

After injection of ingredients into each test flask, the flasks were placed on a New Brunswick Shaker Table and shaken for variable periods of time at approximately 200 rpm's. After each test period, flasks were removed and a sample extracted for sulfide testing using a La Motte Sulfide Color Comparison Test Kit. Sample for the control was taken at time zero for each study.

Results

Trial 1 - Sulfide Reduction: Oxygen only versus Oxygen with Fe—MGDA

| Vessel | Time (min) | Sulfide, mg/l |
|---|---|---|
| Control | 0 | 33 |
| Oxygen only | 5 | 25 |
| Oxygen w FeMGDA | 5 | 10 |

Trial 2 - Sulfide Reduction: Oxygen only versus Oxygen with Fe—MGDA

| Vessel | Time (min) | Sulfide, mg/l |
|---|---|---|
| Control | 0 | 31 |
| Oxygen only | 5 | 25 |
| Oxygen w Fe-MGDA | 5 | 10 |
| Control | 0 | 31 |
| Oxygen only | 22 | 1.5 |
| Oxygen w Fe-MGDA | 22 | 0.2 |

Trial 3 - Sulfide Reduction: Fe—MGDA with Oxygen Rate Study

| Time | Sulfide Remaining, mg/l |
|---|---|
| 0 | 32 |
| 5 | 13 |
| 10 | 0.5 |
| 12.5 | <0.1 |

Conclusions

The rate of removal of sulfide within previously anaerobic wastewater when pure oxygen is applied with Fe-MGDA catalyst is significantly greater than oxygen alone.

Anaerobic Sulfide Treatment: Atmospheric Oxygen Versus Atmospheric Oxygen+Ferric MGDA Catalyst Objective A series of studies were conducted to determine the effect of ferric methylglycine diacetate (Fe MGDA) on the rate of treatment of sulfide within sulfide laden anaerobic wastewater when atmospheric oxygen was injected into the test flask. Flasks injected with atmospheric oxygen alone were compared to flasks injected with Fe MGDA plus atmospheric oxygen.

Procedure

Three 300 milliliter Supelco test flasks were utilized for conducting the testing. Each flask had two valves and a single port for a septum to inject chemistry into the vessel.

Each test flask was completely filled to zero headspace with wastewater from a municipal wastewater treatment facility that had been spiked with sodium sulfide. The pH of the wastewater was adjusted to neutral (approximately 7.0) with dilute hydrochloric acid after the addition of the sodium sulfide prior to filling the test flasks.

Test flasks were left at room temperature for two hours to assure that any oxygen within the wastewater in the test flasks was consumed prior to the study so as to mimic anaerobic wastewater conditions to initiate the study.

Ten cubic centimeter samples (approximately 3 mg O2) were injected into the 300 milliliter test flask to begin each study (total potential O2/liter approximately 10 mg/l). Air was injected simultaneously with a slight opening of a valve on the cylinder so that wastewater could be displaced by the incoming volume of air. Fresh air (approximately 5 cc's) entered the vessel between each sampling event to accommodate for removing sample volume to conduct sulfide test.

For studies conducted with Fe MGDA, air was injected as described followed by injection of approximately 0.1 milliliters of approximately 0.03 M Fe MGDA. The control sample flask received no injection of any ingredients.

After injection of ingredients into each test flask, the flasks were placed on a New Brunswick Shaker Table and shaken for variable periods of time at approximately 200 rpm's. After each test period flasks were removed and a sample extracted for sulfide testing using a La Motte Sulfide Color Comparison Test Kit. Sample for the control was taken at time zero for each study.

Results

Trial 1 - Sulfide Reduction: Air only versus Air with Fe—MGDA

| Time (min) | Control | Air Only | Air w Fe—MGDA |
|---|---|---|---|
| 0 | 33 | | |
| 5 | — | 30 | 22 |
| 10 | — | 24 | 18 |
| 15 | — | 20 | 11 |
| 20 | — | 18 | 9 |

Conclusions

Air with Fe-MGDA was more efficient for sulfide removal within test liquids than was air alone with the air plus Fe-MGDA treatment removing approximately 73% and the air only removing approximately 45% in 20 minutes of contact.

Anaerobic Sulfide Treatment: Pure Oxygen Versus Pure Oxygen+Ferric MGDA Catalyst and Nitrate (Endurox)

Objective

A series of studies were conducted to determine the effect of ferric methylglycine diacetate (Fe MGDA) and nitrate mixture on the rate of treatment of sulfide within sulfide laden anaerobic wastewater when pure oxygen was injected into the test flask. Flasks injected with pure oxygen alone were compared to flasks injected with Fe MGDA/nitrate plus pure oxygen.

Procedure

Three 300 milliliter Supelco test flasks were utilized for conducting the testing. Each flask had two valves and a single port for a septum to inject chemistry into the vessel.

Each test flask was completely filled to zero headspace with wastewater from a municipal wastewater treatment facility that had been spiked with sodium sulfide. The pH of the wastewater was adjusted to neutral (approximately 7.0) with dilute hydrochloric acid after the addition of the sodium sulfide prior to filling the test flasks.

Test flasks were left at room temperature for two hours to assure that any oxygen within the wastewater in the test flasks was consumed prior to the study so as to mimic anaerobic wastewater conditions to initiate the study.

Ten cubic centimeter samples (approximately 14 mg O2) were extracted from the oxygen cylinder in a glass syringe and injected into the 300 milliliter test flask to begin each study (total potential O2/liter approximately 45 mg/l). Oxygen was injected simultaneously with a slight opening of a valve on the cylinder so that wastewater could be displaced by the incoming volume of oxygen. Fresh air (approximately 5 cc's) entered the vessel between each sampling event to accommodate for removing sample volume to conduct sulfide test.

For studies conducted with Fe MGDA/nitrate, oxygen was injected as described followed by injection of approximately 0.1 milliliters of approximately 0.03 M Fe MGDA. Nitrate added within the mixture amounted to approximately 8.75 mg of nitrate (as NO3). The control sample flask received no injection of any ingredients.

After injection of ingredients into each test flask, the flasks were placed on a New Brunswick Shaker Table and shaken for variable periods of time at approximately 200 rpm's. After each test period flasks were removed and a sample extracted for sulfide testing using a La Motte Sulfide Color Comparison Test Kit. Sample for the control was taken at time zero for each study.

Results

| Trial 1 Sulfide Reduction: Pure Oxygen only versus Pure Oxygen with Fe—MGDA/Nitrate | | | |
|---|---|---|---|
| Time (min) | Control | O2 Only | O2 w Fe—MGDA/NO3 |
| 0 | 33 | | |
| 5 | — | 30 | 20 |
| 10 | — | 16 | 10 |

Conclusions

Reduction in sulfide was not improved over Fe MGDA. In fact, the data suggest that the nitrate addition retarded the overall reaction as compared to Fe MGDA alone additions. However, the Fe MGDA/nitrate mixture reduced sulfide at a great rate than pure oxygen alone at approximately 69% as compared to approximately 50%, respectively, after 10 minutes of contact.

Oxidation-Reduction Potential (ORP) Lab Study for Oxygen in Combination with Ferric Methylglycinediacetate Introduction Studies were conducted for the change in oxidation-reduction potential ("ORP") under anaerobic and aerobic starting conditions. The objective of the test was to note differences in ORP as a result of ferric methylglycinediacetate (FeMGDA) addition under varying steady state oxygen related conditions.

Methods

Wastewater samples collected from the activated sludge basin of the Massaponnax Wastewater Treatment Plant, Spotsylvania, Va., were used to determine the effect of FeMGDA on the ORP of wastewater under variable dosage situations. For aerobic studies one liter wastewater samples were aerated with pure oxygen attained from Arcet Gas Supply in Fredericksburg, Va. Pure oxygen was bubbled up through wastewater through a common fish tank aerator stone from an oxygen regulator set at approximately 15 psi. An ORP meter (Oakton Ion 6 Acorn) registered the ORP for each study.

Two general studies were conducted. Study 1 was conducted with initial ORP under aerobic conditions. Oxygen was bubbled through the wastewater until a steady state ORP was achieved. A YSI Oxygen Meter was used to record oxygen levels at that time. Study 2 was conducted by allowing the wastewater to go anaerobic. In this experiment, a one-gallon plastic container was outfitted with a lid that contained an oxygen probe, an ORP probe, an injection/exhaust port and a tube (for the addition of oxygen in Study 3). Each probe and access port was epoxied in place so as to achieve control over leaks of atmospheric oxygen into the one-gallon plastic container. Wastewater for each study was added so as to achieve approximately zero headspace when the "probe-containing" lid was placed on the container.

Study 1 Procedure

The aeration of one liter of wastewater was conducted within a two liter flask; aeration from a pure oxygen cylinder was regulated at approximately 15 psi through an air stone until the solution reached a steady state of ORP. Approximately one milliliter of approximately 0.1 molar FeMGDA was added to the flask and the change in ORP was noted over time.

Results Study 1

TABLE 9

| Change in ORP from Steady State O2 Start as a Result of 0.1 m FeMGDA | | |
|---|---|---|
| Time | ORP | Notes |
| 0 | 77.1 mv | Steady state with pure $O_2$ addition |
| 0-10 seconds | 106.1 mv | Addition of 1 ml 0.1m FeMGDA |
| 5 minutes | 115.4 mv | |
| 10 minutes | 120.6 mv | |
| 15 minutes | 121.8 mv | |
| 20 minutes | 123.2 mv | |
| 30 minutes | 122.9 mv | |

Study 2 Procedure

Wastewater (activated sludge) was added to a one gallon container and the probe-fitted lid attached to achieve approximately zero headspace. The ORP and oxygen levels were monitored as the wastewater oxygen levels dropped into anaerobic conditions (approximately 2 hours). The wastewater was slowly mixed on a continuous basis using a magnetic stirrer (magnet inside of vessel) during the entire study.

After steady state ORP/$O_2$ levels were attained, 0.1 m FeMGDA was slowly added over a 5 minute period. ORP and $O_2$ data was collected during the addition. Results are noted below in Table 10. Additional FeMGDA was added approximately every 5 minutes and the resulting ORP noted just prior to adding each aliquot of FeMGDA to note ORP from previous addition.

TABLE 10

| Affect of 0.1m FeMGDA on ORP Under Anaerobic Conditions | | | | |
|---|---|---|---|---|
| Time | Total FeMGDA added | ORP | Change in ORP | $O_2$ |
| 0 | 0.03 mls/l | −241 mv | — | 0.0 mg/l |
| 5 minutes | | −235 mv | +6 | — |
| 10 minutes | 0.13 mls/l | −227 mv | +14 | — |
| 15 minutes | 0.26 mls/l | −207 mv | +34 | 0.0 mg/l |
| 20 minutes | 0.53 mls/l | −174 mv | +67 | — |

Study 3 Procedure

Wastewater (activated sludge) was added to a one gallon container and the "probe attached" lid described in Study 2 was fitted to the container to achieve zero headspace. The container was slowly mixed with a magnetic stirrer as done in Study 2. The port was fitted with tubing and a valve to allow for off-gassing of the oxygen added in this study. Oxygen was added through the air stone fitted through the lid and the wastewater was allowed to achieve a steady state of $O_2$ content and ORP under aeration. Addition of approximately 0.1 m FeMGDA was done over time with increased addition of FeMGDA as ORP achieved a steady state after each addition.

TABLE 11

Affect of 0.1m FeMGDA on ORP Coming From Anaerobic Conditions to Aerobic Conditions.

| Time | Total FeMGDA added | ORP | Change in ORP | $O_2$ |
|---|---|---|---|---|
| 0 | 0.03 mls/l | −142.1 mv | — | 0.0 mg/l |
| 2 minutes | 0.08 mls/l | −140.4 mv | +1.7 | 2.1 mg/l |
| 4 minutes | 0.13 mls/l | −136.6 mv | +5.5 | 1.8 mg/l |
| 6 minutes | 0.48 mls/l | −126.8 mv | +13.6 | 1.8 mg/l |
| 8 minutes | No addition approximately 2 minutes to steady state from 6 minutes addition | −115.5 mv | +24.9 | 1.8 mg/l |

Conclusion

FeMGDA has a significant affect on the rise of oxidation potential (ORP) under aerobic and anaerobic conditions. Increasing amounts of FeMGDA had a near linear affect on an increase to ORP in all studies. The increase of ORP was much more rapid from steady state in the two studies where oxygen was used, suggesting that oxygen and FeMGDA were reacting to produce a more vigorous oxidant. A logical assumption would be that FeMGDA reacts with $O_2$ to produce superoxides by pulling electrons from the oxygen molecule. A precedent for this assumption can be drawn from FeMGDA reacting with peroxide to produce hydroxyl radicals as previously documented herein.

Pilot Studies

Introduction

A series of pilot studies were performed under a variety of test conditions to verify the efficacy of using combinations of ferric chelates, nitrate, and oxygen for the treatment of sulfide in wastewater. The tests included treatments in open ponds, gravity lines, and force mains at various wastewater treatment operations.

Summary

Laboratory data suggested that significant benefit might be realized in the treatment of sulfide within anaerobic wastewater when combinations of iron chelates, nitrate, and oxygen were applied. The finding was interesting in that the dosages of treatment chemicals were very close to the stoichiometric requirements to oxidize the sulfide alone (approximately 1.0 mole $O_2$ to 1.0 mole sulfide), if nothing else was present within the wastewater. However, testing was done using heavy organically contaminated municipal wastewater. The inventor had suspected that a significant amount of the oxidation treatment chemicals would have been utilized to oxidize the substantial organic material within the wastewater, as well as to overcome the reductive conditions within the anaerobic environment. However, the inventor determined that dosages in the range of approximately 1.5 mg/l to 3.0 mg/l of oxygen in the presence of iron based chelated catalysts (with and without a nitrate component) were all that were required to rapidly oxidize 1.0 mg/l of sulfide (approximately 1.5 to 3.0 moles of oxygen per mole of sulfide) within the anaerobic wastewater. In addition to the treatment effectiveness overall, the rate of treatment of sulfide within the lab was greatly increased with oxygen and iron based chelated catalysts versus oxygen alone. Given that a typical municipal wastewater would have a chemical oxygen demand in the range of approximately 200 mg/l to approximately 400 mg/l, it is interesting that the technique presented was able to effectively oxidize the targeted sulfide component first before being expended for oxidizing other oxidizable compounds within the complex municipal waste stream. Further, it was determined that the effect within a force main could be greatly extended if nitrate were added as a component of the mixture of oxygen and an iron based catalyst.

In general, it was discovered that a combinations of ferric chelates and oxygen worked very well to treat sulfide in situations where the residence time of the wastewater under anaerobic inducing environments (wastewater containing significant levels of biologically digestible material) was less than 8 hours. Addition of oxygen can be held under a ratio of approximately 3 parts oxygen to 1 part sulfide for this period of time as long as an iron based catalyst is also present. For retention time beyond 8 hours under anaerobic conditions it was discovered that combinations of varying amounts of ferric chelates, nitrate, and oxygen worked well. Although not intending to be bound to any particular theory, the inventor speculate that the ferric chelates react with oxygen and nitrate to produce free radicals of nitrate and oxygen capable of preferentially oxidizing sulfide within complex wastewater streams. While both oxygen and nitrate alone can create conditions for the biological destruction of sulfide, the effect is greatly improved beyond the effect of these compounds alone with the addition of ferric chelates. By way of example, a system in Durham, N.C. (that was historically treated with calcium nitrate) was treated with a mixture of water, calcium nitrate, ferric methylglycine diacetate (FeMGDA ferric chelant), and oxygen. The calcium nitrate alone was able to achieve average sulfide levels within this system of approximately 27 ppm (atmospheric) with a dosage of approximately 50 gallons per day of calcium nitrate (approximately 3.5 lbs/gallon CaNO3). The water/FeMGDA/nitrate (commercially Endurox 41) dosage was approximately 7.5 gallons per day. The formulation for liquid Endurox 41 was approximately 66.97/31.75/1.28 by weight of water, calcium nitrate, and FeMGDA. Oxygen was added to the system concurrently with the catalyst solution at a rate of approximately 30 lbs per day. The catalyst/oxygen mixture achieved an average atmospheric concentration of sulfide of approximately 13 ppm over the course of the study.

Results

FIG. 12 presents a table that outlines the results for each system treated during pilot studies. An explanation for each application will detail the table entries for that application.

Clarksville, Ind. Force Main Pilot

System Summary

As outlined in FIG. 12, the Clarksville, Ind. force main was comprised of a 24" diameter line with a length of approximately 7,920 feet from a lift station to a location near the headworks of the Clarksville, Ind. Wastewater Treatment Facility where the line went from force main to gravity into the plant. An injection point was established approximately 3,500 feet from the point at which the line went to gravity flow. Oxygen was fed continuously at this point at a feed rate of approximately 400 lbs/day with a FeMGDA feed rate of approximately 4.5 gallons per day. With estimates of total mass of sulfide produced in this line at approximately 152 lbs/day, the ratio of $O_2$ to sulfide is approximately 2.6 for this particular treatment.

Prior to treatment, the effluent at the point where this line went to gravity flow resulted in very high sulfide odors within the atmosphere. Average results were approximately 550 ppm with spikes over the 1000 ppm detection limit of the Odalog Hydrogen Sulfide Meter that was used (available from Detection Instruments of Phoenix, Ariz.). Untreated sulfide concentration in the wastewater column at the point at which the line went to gravity averaged approximately 13.0 mg/l, as measured with a model DR 800 Spectrophotometer (available from Hach Company of Loveland, Colo.), using the methylene-blue method of detection. After about 24 hours of treatment with the above stated dosing rates the treated levels of sulfide within the water column were consistently less than approximately 0.5 mg/l and average hydrogen sulfide within the atmosphere of less than approximately 5 ppm.

Initial oxygen injection into the force main was conducted using liquid oxygen. Oxygen cylinders were equipped with an evaporator that pushed gaseous oxygen into the system at approximately 70 psi. Flows were regulated with a CON-COA gas regulator valve to achieve the desired oxygen flow at the targeted 580 lbs of oxygen per day. Oxygen was injected directly into the force main without attention to achieving fine bubble diffusion that would have allowed for greater efficiency of oxygen dissolution. However, a special stainless steel fitting was produced to assure that the FeMGDA catalyst and oxygen entered the force main environment at approximately the same location to encourage good contact between the oxygen and the catalyst at the injection point. To make this fitting, two stainless steel ¼" tubes were welded into a 1" stainless cap. Each tube protruded 6" into the wastewater flow when the cap was screwed onto a 1" force main pipe tap. The end of each tube allowed for close contact between the oxygen and the ferric MGDA when both chemicals entered the force main. FeMGDA was fed using a common diaphragm feed pump from Pulsafeeder designed to feed up to 12 gallons per day.

A further change was made for the installation of a permanent system for this location by altering the supply of oxygen from liquid oxygen to oxygen supplied from an onsite generator from AirSep Corp. of Buffalo, N.Y. The AirSep technology utilizes zeolite to filter nitrogen from the atmosphere thereby leaving a gas stream that is greater than approximately 90% oxygen. The AirSep technology does not have to deliver potentially dangerous liquid oxygen to the site and can offer cost advantages for the size of typical treatment applications.

Conclusion

After about one day of treatment the levels of sulfide dropped precipitously to very low levels and the problem with noxious sulfide odors was solved within this line. Ratios of $O_2$ to sulfide was approximately 2.6 with the addition of FeMGDA catalyst for this study, which further verifies the projected effective treatment ratio for treating an anaerobic line within a complex waste water stream.

In addition to the use of AirSep style oxygen generators onsite, it was determined that a more efficient use of oxygen might be obtained in future systems by injecting oxygen through a venturi device manufactured by the Mazzei Corporation of Bakersfield, Calif. The use of a venturi device to inject oxygen into a force main could potentially greatly increase the mixing of oxygen in-line as well as the dissolution of oxygen because of the significant decrease in bubble size. Smaller bubbles might translate into a much higher efficiency of oxygen dissolution due to the dramatic increase in exposed surface area of the oxygen bubbles. Future studies will test this assumption. Further reductions of the ratio of oxygen to sulfide in the presence of iron based catalysts is expected under this treatment condition.

Clarksville, Tenn. Force Dual Force Main Pilot

System Summary

Two small force mains within the Clarksville, Tenn. collection system (Bluegrass and Tylertown lines) intersect after about one mile of pipe length and flow collectively from that point to a point where the line goes to gravity flow after an additional approximately 2300 feet of combined flow (Manifold to Terminus). The exit point for the combined flows is problematic with regard to hydrogen sulfide odors if left untreated.

Existing treatment involves the use of calcium nitrate for odor control. Nitrate alone has not proved to be completely effective for treating these lines with hydrogen sulfide levels in the atmosphere spiking to high levels (approximately 80 ppm) and averaging about 15 ppm at the Manifold to Terminus location. The volume of calcium nitrate used daily within the two lines at the time of this study was approximately 30 gallons/day at each location (total of approximately 60 gallons/day). The concentration of hydrogen sulfide within the atmosphere without any treatment was consistently in the range of approximately 200 ppm with highs of 226 ppm. Typical values in the range of approximately 2.75 ppm of sulfide were present within the wastewater for untreated wastewater at the Manifold to Terminus location (FIG. 12).

Oxygen and FeMGDA (commercially named VTX) additions were administered to each line. The formulation for the FeMGDA amounted to a ratio of water/FeMGDA of approximately 92/8 by weight, respectively. The FeMGDA solution was fed at approximately 1.06 gallons/day and approximately 0.54 gallons/day for Tylertown and Bluegrass, respectively. Oxygen was fed at approximately 30 lbs/day at Tylertown and approximately 20 lbs/day at Bluegrass. The FeMGDA solution and the oxygen were fed slowly and directly into each line immediately past each force main pump on a continuous basis.

As mentioned, the results could only be monitored from the single location at the Manifold to Terminus after each of the two lines had combined. Results were seen within two days of treatment with the concentration of sulfide in the water dropping to non-detection levels (<0.5 ppm) in the wastewater and between approximately 1 ppm to approximately 2 ppm in the atmosphere at the Manifold to Terminus location.

Conclusion

FeMGDA solution with oxygen was a very effective treatment method for this force main system. The process significantly outperformed calcium nitrate as a treatment method.

Midwest Agricultural Processor Pond Pilot

System Summary

A wastewater treatment pond (approximately 94 million gallons) at an agricultural food processing plant in the Midwest was aerated with mechanical aerators. In all there were 15 aerators (15 h.p.) generating approximately 5 lbs of dissolved oxygen each per hour or approximately 75 lbs total oxygen/hour. The pond was heavily laden with organic matter that caused the pond to go anaerobic even though they were being aerated at the surface. Chemical Oxygen Demand (COD) levels were typically in the approximately 900 mg/l range. In spite of vigorous aeration, hydrogen sulfide emissions were detectable downwind of the pond (averaging approximately 0.23 ppm). Sulfide was detectable within the pond wastewater during aeration (ranging from approximately 2.0 mg/l to approximately 5.0 mg/l prior to treatment). Ferric gluconate catalyst (approximately 0.3 M) was added at an average rate of approximately 75 gallons per day into the pond while continuing to aerate. Levels of sulfide in the wastewater dropped from approximately 5.0 to approximately 2.0 after 5 days of chemical addition then quickly dropped to near zero within the air downwind of the facility and, also, within the wastewater. Levels of sulfide were consistently zero after 9 days of treatment until the study ended at 21 days (FIG. 12).

A second pond at this facility (approximately 91 million gallons with the same aerator configuration as the 94 million gallons pond) received a wastewater stream that was not as contaminated as the larger pond. Sulfide levels downwind were similar, however, with aeration only at 0.24 ppm. Sulfide within the wastewater was 2.0 mg/l before the addition of ferric gluconate at about 13.2 gallons per day. Aeration continued as before treatment with ferric gluconate. After five days of treatment sulfide in the downwind air and within the wastewater was zero.

Conclusion

Ferric gluconate catalyst dramatically improved an atmospheric oxygen aeration treatment system for the treatment of sulfide within large wastewater treatment ponds. Oxygen alone could not keep up. The excessive organically contributed CODs within the pond posed a significant demand on oxygen levels within the ponds to the point at which sulfide could form in the ponds (sulfide can only form under anaerobic conditions). Once again it was demonstrated that the addition of an iron based chelated catalyst improved the oxidative potential for oxidizing sulfide in a highly enriched organic environment.

Grand Island, Nebr. Food Processor Pilot

System Summary

A slaughter operation that processed over 6,000 cows per day discharged their effluent to a HDPE covered anaerobic digestion pond. In addition to methane production, the anaerobic pond produced very high levels of sulfide. The discharge for this facility ran through an approximately 3125 foot long, 16" diameter line to the city of Grand Island's Wastewater Treatment Plant. Flows from the processor were about 3.4 million gallons per day of high strength wastewater (COD approximately 8,000 mg/l). The retention time within the line to the plant was approximately 0.283 hours. Pure oxygen gas was fed in-line through 6 ports within the line in an attempt to oxygenate the wastewater for the destruction of sulfide. The process was ineffective and significant levels of sulfide remained after treatment with oxygen. Average sulfide levels leaving the plant were in the range of approximately 250 mg/l within the wastewater and dropped only to about 175 mg/l with oxygen treatment, a drop of approximately 75 mg/l sulfide. Oxygen was consistently fed at approximately 11,520 lbs/day during this period of the test. Therefore, the ratio of oxygen to sulfide treated for oxygen alone was approximately 5.4 for that sulfide treated during the residence time within the line from the slaughter-house to the wastewater treatment plant.

FeMGDA was fed with oxygen at a rate of approximately 192 gallons (approximately 1728 lbs) per day during the pilot testing. At this feed rate nearly complete control of sulfide was attained. Sulfide levels at the wastewater plant dropped to an average of approximately 2.5 mg/l while FeMGDA was being fed which represented a substantial reduction over adding oxygen alone.

The ratio by weight of oxygen to FeMGDA over the course of the test was approximately 6.7 lbs oxygen per 1.0 lbs of liquid FeMGDA catalyst (approximately 0.1 M).

Conclusion

Use of oxygen in combination with FeMGDA catalyst dramatically improved the efficiency of treatment of sulfide over oxygen alone within a highly concentrated, anaerobic slaughter-house wastewater. The use of oxygen alone for treatment utilized a ratio of approximately 5.4 oxygen per 1.0 lbs of sulfide to treat only a fraction of the overall sulfide present (approximately 30%), whereas, the catalyzed process with oxygen achieved approximately 99% treatment of sulfide with approximately 1.7 lbs of oxygen per 1.0 pounds of sulfide within only approximately 0.283 hours of contact time. Therefore, both the rate and the efficiency of treatment were far better using the FeMGDA/oxygen mixture.

Durham, N.C. Force Main Treatment Pilot

System Summary

A 12" force main runs from the Treyburn #3 for approximately 22,500 to the Main Pump Station in North Durham. After about 7,500 feet on this line a second force main from the Snow Hill Pump Station intersects the line and adds additional flow. The Treyburn Hills Pump Station is responsible for approximately 86,000 gallons of the total flow and the Snow Hill Pump Station contributes another approximately 130,000 gallons per day on average. Retention time for the flow from the Treyburn station is estimated at approximately 16.3 hours before exiting to the North Main Pump Station. Both Treyburn #3 and Snow Hill Pump Stations operate on float switches that activate the force main pumps as the flow reaches an activation high level within each pump station wet well.

Existing treatment is conducted from the Treyburn #3 Station only. Calcium nitrate is added to the Treyburn line at a rate of about 50 gallons per day. Durham operators have documented that this method of treatment averages about 27 mg/l of hydrogen sulfide in the atmosphere at a monitoring point just previous to the North Main Pump Station.

Since only one of the two pump stations contributing to this line adds treatment chemicals, it is likely that the flow from the pump station not receiving treatment (Snow Hill Pump Station) contributes sulfide to the atmosphere. Until this line receives treatment, it is not likely that complete control of sulfide will be accomplished.

Oxygen and FeMGDA/nitrate (commercially named Endurox 41) additions were administered to the Treyburn #3 line. The formulation for Endurox 41 (water, nitrate, and FeMGDA) was comprised of a ratio of approximately 66.97/31.75/1.28 by weight, respectively. The calcium nitrate was technical grade at >99% purity and the FeMGDA solution added was approximately 40% by weight with the balance in water and sodium chloride at an approximate pH of 7.0. The FeMGDA/nitrate solution was fed at approximately 7.5 gallons/day. Oxygen was fed at approximately 30 lbs/day. The products were fed directly into the force main immediately past the force main pumps and only came on to inject treatment chemicals when the force main pumps were activated with a float switch.

A second trial used Endurox 11 as a replacement for Endurox 41. The formulation for the Endurox 11 was comprised of a ratio of water to nitrate to FeMGDA of approximately 63.13/31.75/5.12. Feed rates for oxygen and Endurox 11 were substantially identical to the feed rates for the Endurox 41 trial.

A specialized stainless steel injection nozzle was constructed with two ¼ inch stainless steel tubes protruding through a fitting into the wastewater flow to assure that oxygen and Endurox entered as the same point in the line. This was done to achieve good mixing of the Endurox and oxygen as they entered the line.

Results clearly show an improvement between the untreated line and the line when treated with both Endurox 11 and Endurox 41 (FIG. 12). The average airborne hydrogen sulfide levels for both studies were approximately 15 ppm and approximately 13 ppm, respectively. Both of these values are better than the average noted for nitrate treatment alone at approximately 27 ppm. Further, only approximately 7.5 gallons per day of chemical dosage of Endurox 11 and 41 were needed to achieve these treatment levels, along with approximately 30 lbs/day of oxygen. The pilot clearly demonstrated that the addition of both Endurox products with oxygen outperformed calcium nitrate additions for extended time treatment of a force main (>16 hours retention time).

Conclusion

Endurox 11 and 41 alone with oxygen proved to be good control agents for the control of sulfide within a force main with an extended retention time (>16 hours). Both products and oxygen outperformed the use of nitrate as a control agent for this force main treatment scenario.

Consequently, certain exemplary embodiments can provide a system, machine, device, manufacture, circuit, composition of matter, and/or user interface adapted for and/or resulting from, and/or a method and/or machine-readable medium comprising machine-implementable instructions for, activities that can comprise and/or relate to:

in a treatment zone of a manmade container, reacting an oxygen-comprising gas, one or more selected ferric/ferrous chelates, one or more selected nitrates and/or nitrites, and anaerobic wastewater, wherein a mass-to-mass ratio of oxygen in said oxygen-comprising gas when entering said treatment zone to available sulfide in said anaerobic wastewater when entering said treatment zone is at least approximately 1.5 and less than approximately 3.0;

introducing said anaerobic wastewater into said treatment zone;

flowing said anaerobic wastewater through said treatment zone;

injecting said oxygen-comprising gas into said anaerobic wastewater;

diffusing said oxygen-comprising gas into said anaerobic wastewater;

introducing said one or more selected ferric/ferrous chelates into said treatment zone;

mixing said one or more selected ferric/ferrous chelates with said anaerobic wastewater;

introducing said one or more selected nitrates and/or nitrites into said treatment zone during said reacting;

mixing said one or more nitrates and/or nitrites with said anaerobic wastewater;

contacting said oxygen-comprising gas with said anaerobic wastewater for at least approximately 3 minutes in said treatment zone;

oxidizing any of said one or more selected ferric/ferrous chelates that are in a ferrous state to a ferric state;

reducing any of said one or more selected ferric/ferrous chelates that are in a ferric state to a ferrous state;

within said treatment zone, initiating a repeating oxidation-reduction cycle that comprises:

oxidizing any of said one or more selected ferric/ferrous chelates that are in a ferrous state to a ferric state; and reducing any of said one or more selected ferric/ferrous chelates that are in a ferric state to a ferrous state; and/or via said reacting, converting available sulfides in said anaerobic wastewater to sulfur oxides; and/or wherein:

said oxygen-comprising gas is substantially pure oxygen;

said oxygen-comprising gas is compressed air;

said one or more selected ferric/ferrous chelates are one or more ferro aminocarboxylates;

said one or more selected ferric/ferrous chelates are selected from ferric/ferrous MGDA, ferric/ferrous EDTA, ferric/ferrous HEIDA ferric/ferrous NTA, and ferric/ferrous gluconate;

said one or more selected nitrates and/or nitrites comprises a nitrate salt and/or a nitrite salt;

said anaerobic wastewater comprises an oxidant;

a pH of said anaerobic wastewater when prior to entering said treatment zone is within a range of approximately 6.0 to approximately 8.5;

a mass-to-mass ratio of oxygen in said oxygen-comprising gas when entering said treatment zone to available sulfide in said anaerobic wastewater when entering said treatment zone is less than approximately 32.0;

said one or more selected nitrates and/or nitrites, when within said treatment zone, comprises a concentration of nitrate in a range of approximately 3.5 M to approximately 4.5 M; and/or said one or more selected ferric/ferrous chelates, when within said treatment zone, comprises a concentration of ferric/ferrous chelate in a range of approximately 0.05 M to approximately 1.0 M.

DEFINITIONS

When the following terms are used substantively herein, the accompanying definitions apply. These terms and definitions are presented without prejudice, and, consistent with the patent application, the right to redefine these terms during the prosecution of this patent application or any patent application claiming priority hereto is reserved. For the purpose of interpreting a claim of any patent that claims priority hereto, each definition (or redefined term if an original definition was amended during the prosecution of that patent), functions as a clear and unambiguous disavowal of the subject matter outside of that definition.

a—at least one.

active ferric chelate—a ferric chelate that exhibits substantial activity toward oxidation of the contaminant to be degraded, i.e., is capable of generating free radicals or other reactive oxidants from an oxidant in the presence of a medium associated with a contaminant to be treated.

activity—an action, act, step, and/or process or portion thereof.

adapted to—made suitable or fit for a specific use or situation.

adjust—to change, modify, adapt, and/or alter.

air—the earth's atmospheric gas.

aminocarboxylate—a molecule containing carboxyl functional groups bound to an amine group.

anaerobic—a condition where molecular oxygen is substantially absent.

and/or—either in conjunction with or in alternative to.

any—one, some, every, and/or all without specification.

apparatus—an appliance or device for a particular purpose approximately—about and/or nearly the same as.

aqueous oxidizing solution—any solution comprising an oxidizing agent and water.

are—to exist.

associate—to join, connect together, and/or relate.

associated with—related to and/or accompanying.

at least—not less than.

available—obtainable, not busy, not otherwise committed, accessible, present, suitable, and/or ready for use and/or service.

between—in a separating interval and/or intermediate to.

biosolids—stabilized and/or unstabilized solid, semisolid, and/or slurried residuals generated by the biological treatment of sewage, petroleum refining waste, and/or industrial chemical manufacturing wastewater.

can—is capable of, in at least some embodiments.

cause—to bring about, provoke, precipitate, produce, elicit, be the reason for, result in, and/or effect.

chelate—a chemical compound in the form of a heterocyclic ring, containing a metal ion attached by coordinate bonds to at least two nonmetal ions.

chelating agent (a.k.a. "chelate")—a heterocyclic compound having a central metallic ion attached by covalent bonds to two or more nonmetallic atoms in the same molecule.

composition of matter—a combination of two or more substances, the combination typically possessing one or more properties that belong to none of those substances in their separate state.

compress—to decrease the volume of air and/or other gas by the application of pressure.

comprises—includes, but is not limited to, what follows.

comprising—including but not limited to, what follows.

concentration—measure of how much of a given substance there is mixed, dissolved, contained, and/or otherwise present in and/or with another substance.

contact—to touch and/or come together.

container—an enclosure adapted to constrain a flow of a fluid.

contaminant—any substance that can be oxidized, such as, for example, a chemical compound, chemical mixture, organic compound, inorganic compound, hydrogen sulfide, and/or biological, etc. As a further example, the contaminant can be an organic compound, an organic compound having at least one aromatic functional group, and/or an organic compound having at least one aliphatic functional group, etc.

converting—the act of transforming.

cycle—a set of predetermined activities.

device—a machine, manufacture, and/or collection thereof.

different—changed, distinct, and/or separate.

diffuse—to widely spread and/or scatter.

during—at some time in a time interval.

EDTA—ethylenediaminetetracetic acid.

effective—sufficient to bring about, provoke, elicit, and/or cause.

enter—to come and/or flow into.

environment—all external conditions that affect an organism or other specified system during its lifetime.

ferric—of, relating to, and/or containing iron, especially with valence 3 and/or in its plus-three oxidation state, Fe(III) (sometimes designated $Fe^{3+}$) and/or a valence higher than in a corresponding ferrous compound.

ferric chelate—any organic and inorganic polydentate ligand complexed with ferric ion, Fe(III), and/or ferrous ion, Fe(II), including the ferro aminocarboxylates (such as ferric/ferrous MGDA, ferric/ferrous EDTA, ferric/ferrous HEIDA, and/or ferric/ferrous NTA, etc.), ferric/ferrous gluconate, etc.

ferric/ferrous—ferric and/or ferrous.

ferro—iron containing and/or ferric and/or ferrous.

ferrous—of or containing iron, especially with valence 2 and/or in its plus-two oxidation state, Fe(II) (sometimes designated $Fe^{2+}$) and/or a valence lower than in a corresponding ferric compound.

flow—to stream and/or continuously transfer.

for—with a purpose of.

from—used to indicate a source.

further—in addition.

gas—a substance in a gaseous state, that is, in a state of matter distinguished from the solid and liquid states by relatively low density and viscosity, relatively great expansion and contraction with changes in pressure and temperature, the ability to diffuse readily, and the spontaneous tendency to become distributed uniformly throughout any container.

generate—to create, produce, give rise to, and/or bring into existence.

gluconate—any salt or ester of gluconic acid

HEIDA—hydroxyethyliminodiacetic acid initiate—to begin and/or start.

inject—to place into an orbit, trajectory, and/or stream.

into—to a condition, state, or form of introduce—to insert, inject, and/or put inside and/or into.

ion—an electrically charged atom or group of atoms formed by the loss or gain of one or more electrons, as a cation (positive ion), which is created by electron loss and is attracted to the cathode in electrolysis, or as an anion (negative ion), which is created by an electron gain and is attracted to the anode. The valence of an ion is equal to the number of electrons lost or gained and is indicated by a plus sign for cations and a minus sign for anions, thus: Na+, Cl—, Ca++, S=.

less than—having a measurably smaller magnitude and/or degree as compared to something else.

maintain—to retain, preserve, sustain, keep in an existing state, and/or continue to obtain.

manmade—a tangible physical item that is synthetic and/or made by humans rather than occurring in nature.

mass-to-mass ratio—the mass of a first substance expressed with respect to the mass of a second substance.

may—is allowed and/or permitted to, in at least some embodiments.

medium—any substance or material, such as one or more solids, liquids, vapors, fluids, water, and/or air, etc.

method—a process, procedure, and/or collection of related activities for accomplishing something.

MGDA—Methyl Glycine Di-Acetate, methylglycinediacetate, and/or trisodium methylglycinediacetate.

mix—to combine and/or blend into one mass, stream, and/or mixture.

more—a quantifier meaning greater in size, amount, extent, and/or degree.

nitrate—the univalent radical NO3 or a compound containing it, as a salt or an ester of nitric acid.

nitrate/nitrite—nitric acid, nitrous acid, and/or any salt, ester, alcohol, and/or oxidized ion of nitric acid or nitrous acid, having the molecular formula $NO^{3-}$ or $NO^{2-}$, such as calcium nitrate, sodium nitrate, ammonium nitrate, potassium nitrate, sodium nitrite, potassium nitrite, ammonium nitrite, and/or calcium nitrite, etc.

nitrite—the univalent radical NO2 or a compound containing it, such as a salt or an ester of nitrous acid.

NTA—nitrilotriacetic acid occur—to happen, take place, and/or come about.

oxidation-reduction—a reversible chemical process usually involving the transfer of electrons, in which one reaction is an oxidation and the reverse reaction is a reduction.

oxide—any compound of oxygen with another element.

oxidize—to undergo and/or cause to undergo a chemical reaction and/or combination with oxygen; to convert (an element) into an oxide; to form and/or cause to form a layer of metal oxide, as in rusting; to add oxygen and/or any nonmetal; to lose and/or cause to lose hydrogen atoms; and/or to undergo and/or cause to undergo a decrease in the number of electrons, thereby increasing the valence.

oxidizing agent ("oxidant")—a substance, such as a hydrogen peroxide, calcium peroxide, magnesium peroxide, ozone, persulfate, chlorite, hypochlorite, chlorine, bromine, permanganate, peracetic acid, and/or chlorine dioxide, that oxidizes another substance, usually by accepting electrons.

oxygen—a nonmetallic element, which constitutes approximately 21 percent of the earth's atmosphere by volume, which occurs as a diatomic gas, 02, and which is assigned atomic number 8, and has atomic weight 15.9994.

peroxide—a compound containing a bivalent —OO— group in the molecule.

pH—a measure representing the base 10 logarithm of the reciprocal of hydrogen ion concentration in gram atoms per liter, used to express the acidity or alkalinity of a solution on a scale of 0 to 14, where less than 7 represents acidity, 7 neutrality, and more than 7 alkalinity.

plurality—the state of being plural and/or more than one.

portion—a part, component, section, percentage, ratio, and/or quantity that is less than a larger whole.

ppm—parts per million.

predetermine—to determine, decide, and/or establish in advance.

prevent—to hinder, avert, and/or keep from occurring.

prior—before and/or preceding in time or order.

probability—a quantitative representation of a likelihood of an occurrence.

product—something produced by human or mechanical effort or by a natural process.

provide—to furnish, supply, give, and/or make available.

pure—having a substantially homogeneous and/or uniform composition, not mixed, and/or substantially free of foreign substances.

range—a measure of an extent of a set of values and/or an amount and/or extent of variation.

ratio—a relationship between two quantities expressed as a quotient of one divided by the other.

react—to undergo a reaction.

reactants—substances that react in a chemical reaction.

reacting—to cause (a substance or substances) to undergo a reaction.

reaction—a change and/or transformation in which a substance decomposes, combines with other substances, and/or interchanges constituents with other substances.

reaction product—something produced by a chemical reaction.

reduce—to make and/or become lesser and/or smaller.

repeat—to do again and/or perform again.

repeatedly—again and again; repetitively.

result—(n.) an outcome and/or consequence of a particular action, operation, and/or course; (v.) to cause an outcome and/or consequence of a particular action, operation, and/or course.

said—when used in a system or device claim, an article indicating a subsequent claim term that has been previously introduced.

salt—a chemical compound formed by replacing all or part of the hydrogen ions of an acid with metal ions and/or electropositive radicals.

selected—a chosen item.

set—a related plurality.

source—an compound comprising and/or capable of generating.

state—a qualitative and/or quantitative description of condition.

substantially—to a great extent or degree.

sulfide—any compound of sulfur and another element, the compound containing the sulfur 2-ion or sulfur with an oxidation state of −2.

system—a collection of mechanisms, devices, machines, articles of manufacture, processes, data, and/or instructions, the collection designed to perform one or more specific functions.

that—used as the subject or object of a relative clause.

through—across, among, between, and/or in one side and out the opposite and/or another side of treatment—administration or application of one or more chemicals to a substance and/or item.

via—by way of and/or utilizing.

wastewater—liquid and/or waterborne wastes generated by residential, commercial, and/or industrial operations, and potentially including sewage, excrement, dissolved solids, suspended solids, surface water, storm water, and/or groundwater.

weight—a value indicative of importance.

when—at a time and/or during the time at which.

wherein—in regard to which; and; and/or in addition to.

within—inside the limits of.

zone—a region and/or volume having at least one predetermined boundary.

Note

Various substantially and specifically practical and useful exemplary embodiments of the claimed subject matter are described herein, textually and/or graphically, including the best mode, if any, known to the inventor(s), for implementing the claimed subject matter by persons having ordinary skill in the art. Any of numerous possible variations (e.g., modifications, augmentations, embellishments, refinements, and/or enhancements, etc.), details (e.g., species, aspects, nuances, and/or elaborations, etc.), and/or equivalents (e.g., substitutions, replacements, combinations, and/or alternatives, etc.) of one or more embodiments described herein might become apparent upon reading this document to a person having ordinary skill in the art, relying upon his/her expertise and/or knowledge of the entirety of the art and without exercising undue experimentation. The inventor(s) expects skilled artisans to implement such variations, details, and/or equivalents as appropriate, and the inventor(s) therefore intends for the claimed subject matter to be practiced other than as specifically described herein. Accordingly, as permitted by law, the claimed subject matter includes and covers all variations, details, and equivalents of that claimed subject matter. Moreover, as permitted by law, every combination of the herein described characteristics, functions, activities, substances, and/or structural elements, and all possible variations, details, and equivalents thereof, is encompassed by the claimed subject matter unless otherwise clearly indicated herein, clearly and specifically disclaimed, or otherwise clearly contradicted by context.

The use of any and all examples, or exemplary language (e.g., "such as") provided herein, is intended merely to better illuminate one or more embodiments and does not pose a limitation on the scope of any claimed subject matter unless otherwise stated. No language herein should be construed as indicating any non-claimed subject matter as essential to the practice of the claimed subject matter.

Thus, regardless of the content of any portion (e.g., title, field, background, summary, description, abstract, drawing figure, etc.) of this document, unless clearly specified to the contrary, such as via explicit definition, assertion, or argument, or clearly contradicted by context, with respect to any claim, whether of this document and/or any claim of any document claiming priority hereto, and whether originally presented or otherwise:

there is no requirement for the inclusion of any particular described characteristic, function, activity, substance, or structural element, for any particular sequence of activities, for any particular combination of substances, or for any particular interrelationship of elements;

no described characteristic, function, activity, substance, or structural element is "essential";

any two or more described substances can be mixed, combined, reacted, separated, and/or segregated;

any described characteristics, functions, activities, substances, and/or structural elements can be integrated, segregated, and/or duplicated;

any described activity can be repeated, any activity can be performed by multiple entities, and/or any activity can be performed in multiple jurisdictions; and any described characteristic, function, activity, substance, and/or structural element can be specifically excluded, the sequence of activities can vary, and/or the interrelationship of structural elements can vary.

The use of the terms "a", "an", "said", "the", and/or similar referents in the context of describing various embodiments (especially in the context of the following claims) are to be construed to cover both the singular and the plural, unless otherwise indicated herein or clearly contradicted by context.

The terms "comprising," "having," "including," and "containing" are to be construed as open-ended terms (i.e., meaning "including, but not limited to,") unless otherwise noted.

When any number or range is described herein, unless clearly stated otherwise, that number or range is approximate. Recitation of ranges of values herein are merely intended to serve as a shorthand method of referring individually to each separate value falling within the range, unless otherwise indicated herein, and each separate value and each separate subrange defined by such separate values is incorporated into the specification as if it were individually recited herein. For example, if a range of 1 to 10 is described, that range includes all values therebetween, such as for example, 1.1, 2.5, 3.335, 5, 6.179, 8.9999, etc., and includes all subranges therebetween, such as for example, 1 to 3.65, 2.8 to 8.14, 1.93 to 9, etc.

When any phrase (i.e., one or more words) appearing in a claim is followed by a drawing element number, that drawing element number is exemplary and non-limiting on claim scope.

No claim of this document is intended to invoke paragraph six of 35 USC 112 unless the precise phrase "means for" is followed by a gerund.

Any information in any material (e.g., a United States patent, United States patent application, book, article, etc.) that has been incorporated by reference herein, is incorporated by reference herein in its entirety to its fullest enabling extent permitted by law yet only to the extent that no conflict exists between such information and the other statements and drawings set forth herein. In the event of such conflict, including a conflict that would render invalid any claim herein or seeking priority hereto, then any such conflicting information in such material is specifically not incorporated by reference herein.

Within this document, and during prosecution of any patent application related hereto, any reference to any claimed subject matter is intended to reference the precise language of the then-pending claimed subject matter at that particular point in time only.

Accordingly, every portion (e.g., title, field, background, summary, description, abstract, drawing figure, etc.) of this document, other than the claims themselves and any provided definitions of the phrases used therein, is to be regarded as illustrative in nature, and not as restrictive. The scope of subject matter protected by any claim of any patent that issues based on this document is defined and limited only by the precise language of that claim (and all legal equivalents thereof) and any provided definition of any phrase used in that claim, as informed by the context of this document.

What is claimed is:

1. A method comprising:
in a treatment zone of a manmade container, reacting one or more selected ferric/ferrous chelates, an anaerobic aqueous solution, and an oxygen-comprising gas and/or one or more selected nitrates and/or nitrites, wherein:
a mass-to-mass ratio of oxygen in said oxygen-comprising gas when entering said treatment zone to available sulfide in said anaerobic aqueous solution when entering said treatment zone is at least approximately 1.5 and less than approximately 3.0; and/or
said one or more selected nitrates and/or nitrites, when within said treatment zone, comprises a concentration of nitrate in a molar ratio of approximately 3.5 M to approximately 4.5 M per 1.0 M of sulfide.

2. The method of claim 1, further comprising:
introducing said one or more selected ferric/ferrous chelates into said treatment zone.

3. The method of claim 1, further comprising:
mixing said one or more selected ferric/ferrous chelates with said anaerobic aqueous solution.

4. The method of claim 1, further comprising:
introducing said anaerobic aqueous solution into said treatment zone.

5. The method of claim 1, further comprising:
flowing said anaerobic aqueous solution through said treatment zone.

6. The method of claim 1, further comprising:
injecting said oxygen-comprising gas into said anaerobic aqueous solution.

7. The method of claim 1, further comprising:
diffusing said oxygen-comprising gas into said anaerobic aqueous solution.

8. The method of claim 1, further comprising:
contacting said oxygen-comprising gas with said anaerobic aqueous solution for at least approximately 3 minutes in said treatment zone.

9. The method of claim 1, further comprising:
introducing said one or more selected nitrates and/or nitrites into said treatment zone during said reacting.

10. The method of claim 1, further comprising:
introducing said one or more selected nitrates and/or nitrites into said treatment zone during said reacting, said one or more selected nitrates and/or nitrites comprising a nitrate salt and/or a nitrite salt.

11. The method of claim 1, further comprising:
mixing said one or more nitrates and/or nitrites with said anaerobic aqueous solution.

12. The method of claim 1, further comprising:
oxidizing any of said one or more selected ferric/ferrous chelates that are in a ferrous state to a ferric state.

13. The method of claim 1, further comprising:
reducing any of said one or more selected ferric/ferrous chelates that are in a ferric state to a ferrous state.

14. The method of claim 1, further comprising:
within said treatment zone, initiating a repeating oxidation-reduction cycle that comprises:
   oxidizing any of said one or more selected ferric/ferrous chelates that are in a ferrous state to a ferric state; and
   reducing any of said one or more selected ferric/ferrous chelates that are in a ferric state to a ferrous state.

15. The method of claim 1, further comprising:
via said reacting, converting available sulfides in said anaerobic aqueous solution to elemental sulfur.

16. The method of claim 1, wherein:
said one or more selected ferric/ferrous chelates are one or more ferro aminocarboxylates.

17. The method of claim 1, wherein:
said one or more selected ferric/ferrous chelates are selected from ferric/ferrous MGDA, ferric/ferrous EDTA, ferric/ferrous HEIDA ferric/ferrous NTA, and ferric/ferrous gluconate.

18. The method of claim 1, wherein:
said one or more selected ferric/ferrous chelates is ferric/ferrous MGDA.

19. The method of claim 1, wherein:
said one or more selected ferric/ferrous chelates is ferric/ferrous gluconate.

20. The method of claim 1, wherein:
said one or more selected ferric/ferrous chelates, when within said treatment zone, comprises a concentration of ferric/ferrous chelate in a range of approximately 0.05 M to approximately 1.0 M.

21. The method of claim 1, wherein:
said anaerobic aqueous solution comprises an oxidant.

22. The method of claim 1, wherein:
a pH of said anaerobic aqueous solution when prior to entering said treatment zone is within a range of approximately 6.0 to approximately 8.5.

23. The method of claim 1, wherein:
said oxygen-comprising gas is substantially pure oxygen.

24. The method of claim 1, wherein:
said oxygen-comprising gas is compressed air.

25. The method of claim 1, wherein:
a mass-to-mass ratio of oxygen in said oxygen-comprising gas when entering said treatment zone to available sulfide in said anaerobic aqueous solution when entering said treatment zone is less than approximately 3.0.

* * * * *